(12) United States Patent
Hokoi et al.

(10) Patent No.: US 10,035,502 B2
(45) Date of Patent: Jul. 31, 2018

(54) HYBRID VEHICLE AND CONTROL METHOD FOR HYBRID VEHICLE

(71) Applicants: TOYOTA JIDOSHA KABUSHIKI KAISHA, Toyota-shi, Aichi-ken (JP); FUJITSU TEN LIMITED, Kobe-shi, Hyogo (JP)

(72) Inventors: Koji Hokoi, Toyota (JP); Koji Yoshihara, Kariya (JP); Kotaro Inaoka, Kobe (JP); Koji Yamamoto, Okazaki (JP)

(73) Assignees: Toyota Jidosha Kabushiki Kaisha, Toyota-shi, Aichi-ken (JP); Fujitsu Ten Limited, Kobe-shi, Hyogo (JP)

( * ) Notice: Subject to any disclaimer, the term of this patent is extended or adjusted under 35 U.S.C. 154(b) by 0 days.

(21) Appl. No.: 15/607,949

(22) Filed: May 30, 2017

(65) Prior Publication Data
US 2017/0349157 A1 Dec. 7, 2017

(30) Foreign Application Priority Data
Jun. 3, 2016 (JP) .................................. 2016-111731

(51) Int. Cl.
*B60W 10/08* (2006.01)
*B60K 6/445* (2007.10)
(Continued)

(52) U.S. Cl.
CPC ............. *B60W 10/08* (2013.01); *B60K 6/365* (2013.01); *B60K 6/383* (2013.01); *B60K 6/445* (2013.01); *B60K 6/48* (2013.01); *B60W 10/06* (2013.01); *B60W 20/00* (2013.01); *B60W 20/10* (2013.01); *B60W 20/19* (2016.01); *B60W 20/40* (2013.01); *B60K 2006/266* (2013.01);
(Continued)

(58) Field of Classification Search
CPC ...... B60W 10/08; B60W 10/06; B60W 20/19; B60W 20/06; B60W 20/00; B60W 20/10; B60W 20/40; B60K 6/365; B60K 6/383; B60K 6/445; B60K 6/48
See application file for complete search history.

(56) References Cited

U.S. PATENT DOCUMENTS

| 6,553,287 | B1 | 4/2003 | Supina et al. |
| 2008/0287252 | A1* | 11/2008 | Kaya .................... B60K 6/365 477/4 |

(Continued)

FOREIGN PATENT DOCUMENTS

JP 2003-201880 7/2003

*Primary Examiner* — Erez Gurari
(74) *Attorney, Agent, or Firm* — Finnegan, Henderson, Farabow, Garrett & Dunner, LLP

(57) ABSTRACT

When an output limitation value of a battery is equal to or less than a threshold, an electronic control unit determines that basic torque is able to be output from a second motor to a drive shaft. Then, the electronic control unit sets a predetermined value as a target motoring rotation speed for ending motoring of an engine by a first motor. When the output limitation value is greater than the threshold, the electronic control unit determines that the basic torque is unable to be output from the second motor to the drive shaft at the time of starting the engine, and sets a value smaller than the predetermined value as the target motoring rotation speed.

8 Claims, 13 Drawing Sheets

(51) Int. Cl.
*B60W 10/06* (2006.01)
*B60K 6/365* (2007.10)
*B60K 6/383* (2007.10)
*B60K 6/48* (2007.10)
*B60W 20/00* (2016.01)
*B60W 20/10* (2016.01)
*B60W 20/40* (2016.01)
*B60W 20/19* (2016.01)
*B60K 6/26* (2007.10)

(52) U.S. Cl.
CPC ... *B60L 2240/423* (2013.01); *B60L 2240/486* (2013.01); *B60W 2510/083* (2013.01); *B60W 2510/085* (2013.01); *B60W 2510/244* (2013.01); *B60W 2510/246* (2013.01); *B60W 2520/10* (2013.01); *B60W 2540/10* (2013.01); *B60W 2710/0644* (2013.01); *B60W 2710/083* (2013.01)

(56) References Cited

U.S. PATENT DOCUMENTS

| | | | | |
|---|---|---|---|---|
| 2009/0256513 A1* | 10/2009 | Ando | B60K 6/445 | 318/478 |
| 2009/0301800 A1* | 12/2009 | Oba | B60K 6/365 | 180/65.25 |
| 2009/0321163 A1* | 12/2009 | Suzui | B60K 6/365 | 180/65.265 |
| 2010/0012407 A1* | 1/2010 | Oba | B60K 6/365 | 180/65.23 |
| 2010/0076635 A1* | 3/2010 | Sugimoto | B60K 6/445 | 701/22 |
| 2010/0113213 A1* | 5/2010 | Oba | B60K 6/365 | 477/5 |
| 2010/0222949 A1* | 9/2010 | Muta | B60K 6/365 | 701/22 |
| 2010/0235070 A1* | 9/2010 | Amano | B60K 6/365 | 701/103 |
| 2010/0256849 A1* | 10/2010 | Akimoto | B60K 6/445 | 701/22 |
| 2010/0256895 A1* | 10/2010 | Harada | B60K 6/445 | 701/108 |
| 2012/0041630 A1* | 2/2012 | Yamamoto | B60K 6/365 | 701/22 |
| 2012/0136519 A1* | 5/2012 | Suzuki | B60W 20/00 | 701/22 |
| 2013/0332017 A1* | 12/2013 | Hisano | B60W 20/106 | 701/22 |
| 2014/0025242 A1* | 1/2014 | Kuramoto | B60K 6/383 | 701/22 |
| 2014/0135168 A1* | 5/2014 | Yokoo | B60K 6/52 | 477/8 |
| 2015/0025728 A1* | 1/2015 | Hase | B60K 6/445 | 701/22 |
| 2015/0239461 A1* | 8/2015 | Takahashi | B60W 30/18036 | 701/22 |
| 2016/0193908 A1* | 7/2016 | Kanada | B60K 6/365 | 475/5 |
| 2016/0236669 A1* | 8/2016 | Amano | B60W 20/10 | |
| 2017/0008508 A1* | 1/2017 | Sato | B60W 10/06 | |
| 2017/0144652 A1* | 5/2017 | Hokoi | B60K 6/28 | |
| 2017/0327107 A1* | 11/2017 | Ando | B60W 20/50 | |
| 2017/0349157 A1* | 12/2017 | Hokoi | B60K 6/445 | |

\* cited by examiner

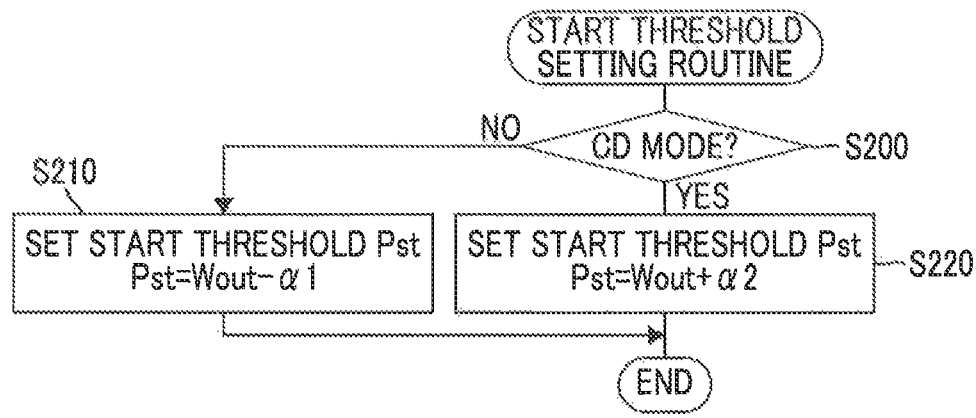
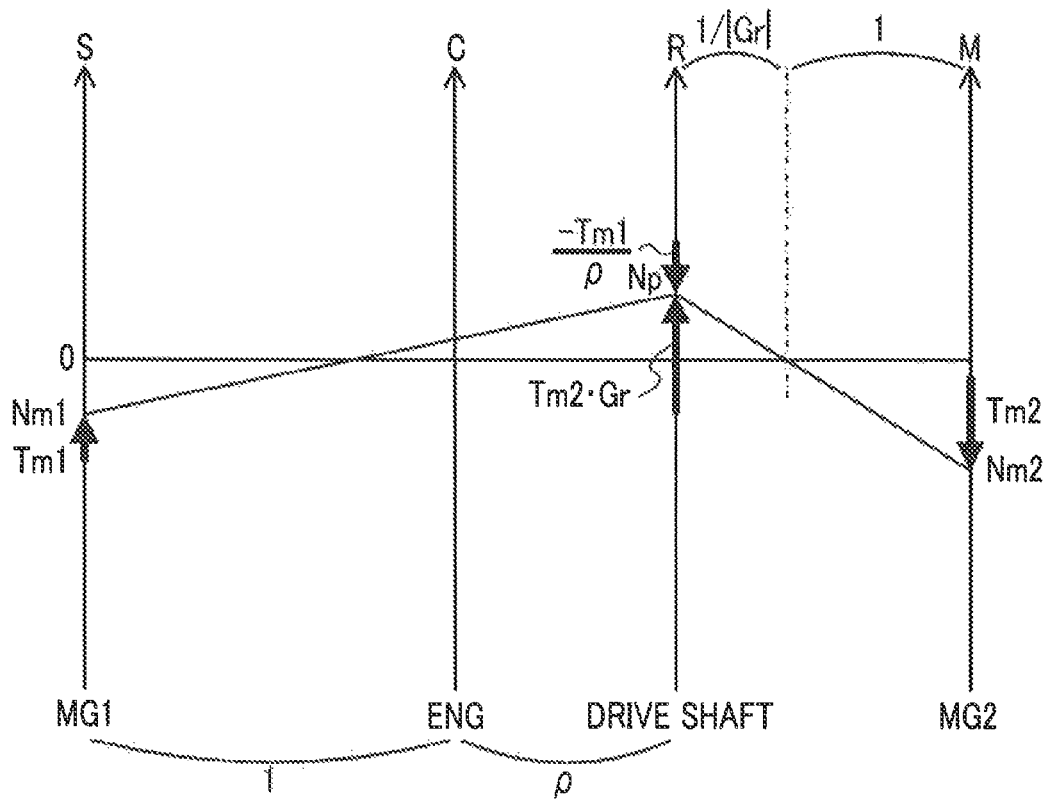

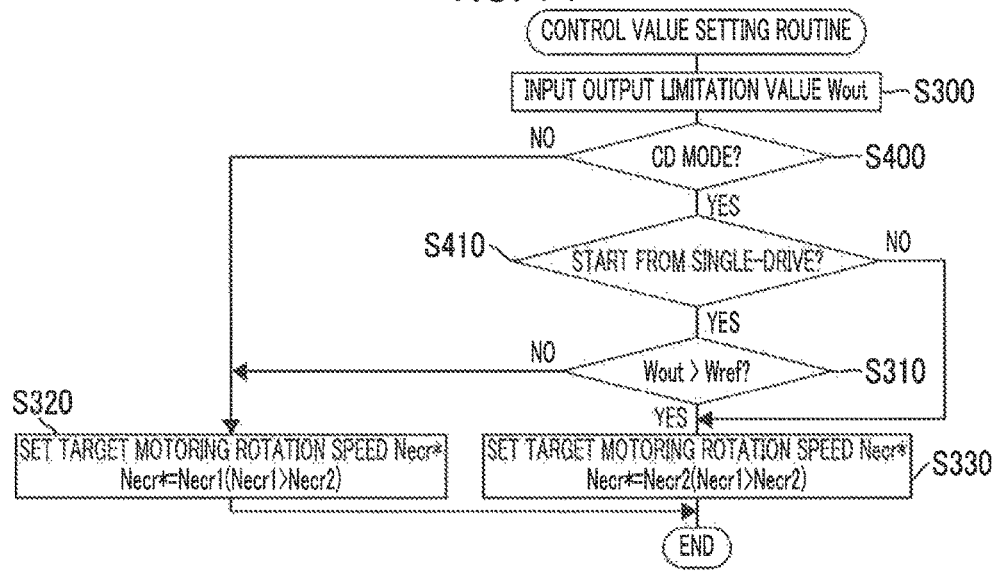
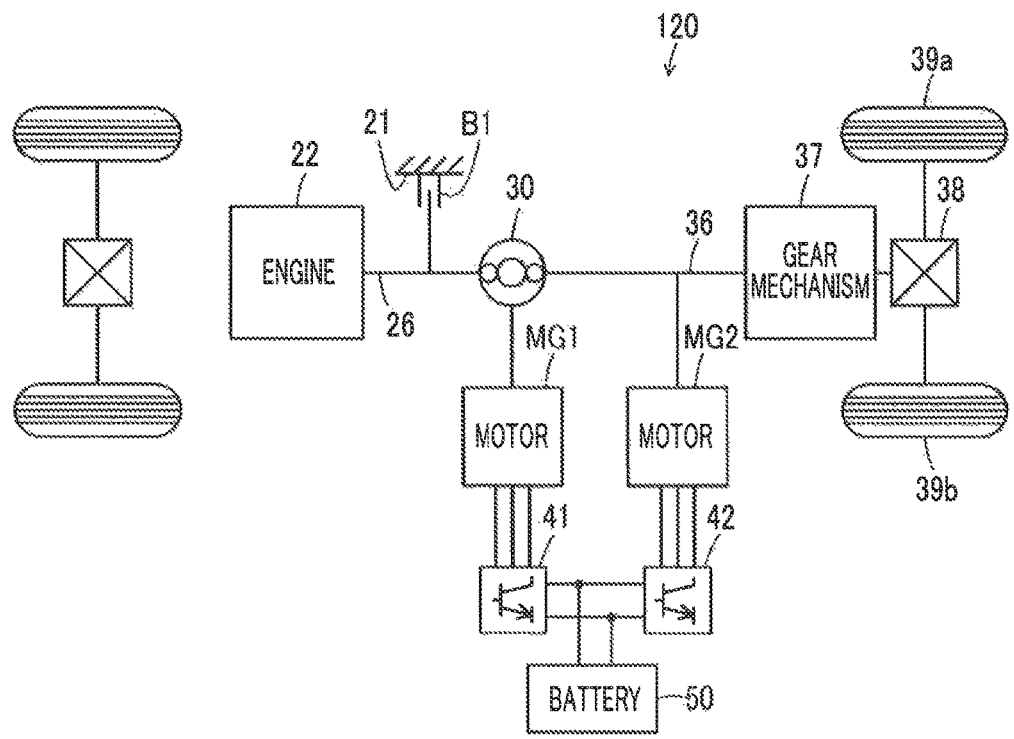

HYBRID VEHICLE AND CONTROL METHOD FOR HYBRID VEHICLE

INCORPORATION BY REFERENCE

The disclosure of Japanese Patent Application No. 2016-111731 filed on Jun. 3, 2016 including the specification, drawings and abstract is incorporated herein by reference in its entirety.

BACKGROUND

1. Technical Field

The present disclosure relates to a hybrid vehicle and a control method for a hybrid vehicle.

2. Description of Related Art

A hybrid vehicle in which a motor generator is connected to a sun gear of a planetary gear, an engine is connected to a carrier of a planetary gear, and a drive shaft is connected to a ring gear of a planetary gear, a propulsion motor is connected to the drive shaft, and a one-way clutch configured to inhibit reverse rotation (negative rotation) of the engine is provided has been suggested (for example, see Japanese Patent Application Publication No. 2003-201880 (JP 2003-201880 A)). In this hybrid vehicle, when a maximum acceleration is required and estimated total torque of the propulsion motor and the motor generator is smaller than maximum total torque of the propulsion motor and the engine during engine stop, the engine is started.

SUMMARY

In such a hybrid vehicle, at the time of starting the engine, the motor generator and the propulsion motor are controlled as follows. The motor generator is controlled such that motoring torque for motoring the engine is output from the motor generator. The propulsion motor is controlled such that post-limitation torque obtained by limiting basic torque such that charge/discharge power of a battery is within a range of the maximum allowable power and torque from the propulsion motor is within a range of rated torque is output from the propulsion motor to the drive shaft. The basic torque is torque which is the sum of required torque required for the drive shaft and cancel torque for cancelling torque applied to the drive shaft with the output of the motoring torque from the motor generator. At this time, if the basic torque is unable to be output from the propulsion motor to the drive shaft (the post-limitation torque is smaller than the basic torque), torque output to the drive shaft drops compared to before motoring of the engine by the motor generator is started. If this state is continued for a comparatively long time, a driver is likely to feel a sense of failure in acceleration (a sense of torque loss).

The hybrid vehicle and the control method for a hybrid vehicle of the disclosure are to prevent a driver from feeling a sense of failure in acceleration (a sense of torque loss).

A first aspect of the disclosure is a hybrid vehicle. The hybrid vehicle includes an engine, a first motor, a drive shaft, a planetary gear device, a second motor, a battery, and an electronic control unit. The drive shaft is coupled to the first motor and an axle. The planetary gear device includes at least one planetary gear. The at least one planetary gear includes rotating elements. The rotating elements are connected to the engine and the drive shaft such that the first motor, the engine, and the drive shaft are arranged in this order in a collinear diagram. The second motor is mechanically coupled to the drive shaft. The battery is configured to exchange electric power with the first motor and the second motor. The electronic control unit is configured to perform control such that motoring torque for motoring the engine is output from the first motor during starting the engine. The electronic control unit is configured to perform control such that post-limitation torque is output from the second motor to the drive shaft. The post-limitation torque is torque obtained by limiting basic torque such that charge and discharge power of the battery is within a range of maximum allowable power of the battery and torque from the second motor is within a range of rated torque of the second motor. The basic torque is the sum of required torque and cancel torque. The required torque is torque required for the drive shaft. The cancel torque is torque for cancelling torque applied to the drive shaft with the output of the motoring torque from the first motor. The electronic control unit is configured to perform either of first control or second control when the basic torque is unable to be output from the second motor to the drive shaft. The first control is control for making a target motoring rotation speed lower than when the basic torque is output from the second motor to the drive shaft. The target motoring rotation speed is a rotation speed of the engine for ending the output of the motoring torque from the first motor. The second control is control for making a motoring time shorter than when the basic torque is output from the second motor to the drive shaft. The motoring time is a time for outputting the motoring torque from the first motor.

According to the above-described configuration, when the basic torque is unable to be output from the second motor to the drive shaft, one of the first control for making the target motoring rotation speed lower and the second control for making the motoring time shorter is performed, whereby it is possible to reduce a time for which torque output to the drive shaft drops. As a result, it is possible to prevent a driver from feeling a sense of failure in acceleration (a sense of torque loss).

In the above-described hybrid vehicle, the electronic control unit may be configured to perform a third control when the basic torque is unable to be output from the second motor to the drive shaft. The third control may be control for making the motoring torque lower than when the basic torque is output from the second motor to the drive shaft. According to the above-described configuration, it is possible to reduce the amount of drop of torque output to the drive shaft when the basic torque is unable to be output from the second motor to the drive shaft. Since the motoring time is extended when the motoring torque is decreased compared to when the motoring torque is not decreased, it is necessary to decrease the motoring torque within a range in which the motoring time is shorter than when the basic torque is able to be output from the second motor to the drive shaft.

In the above-described hybrid vehicle, the hybrid vehicle may include a rotation regulating mechanism configured to regulate the rotation of the engine. The electronic control unit may be configured to perform dual-drive control while outputting the rated torque from the second motor when the maximum allowable power of the battery is greater than rated power of the second motor and required power according to the required torque is greater than the rated power of the second motor in an electric traveling state. The electric traveling state may be a state that the hybrid vehicle travels with bringing the engine into a rotation stop state by the rotation regulating mechanism. The dual-drive control may be control for controlling the first motor and the second motor such that the hybrid vehicle travels with torque from the first motor and the second motor. The electronic control unit may be configured to determine that the basic torque is unable to be output from the second motor to the drive shaft when the engine is started during the execution of the dual-drive control. According to the above-described configuration, since the rated torque is output from the second motor during dual-drive, during starting the engine from dual-drive, the basic torque is unable to be output from the second motor to the drive shaft. Therefore, the determination is made in this way, and the target motoring rotation speed is made lower or the motoring time is made shorter, whereby it is possible to reduce the time for which torque output to the drive shaft drops.

In the above-described hybrid vehicle, the electronic control unit may be configured to start the engine when the required power according to the required torque is greater than a start threshold. The start threshold may be set to be greater when the maximum allowable power of the battery is large than when the maximum allowable power of the battery is small. The electronic control unit may be configured to determine that the basic torque is able to be output from the second motor to the drive shaft during starting the engine when the maximum allowable power of the battery is equal to or less than predetermined power smaller than rated power of the second motor. The electronic control unit may be configured to determine that the basic torque is unable to be output from the second motor to the drive shaft during starting the engine when the maximum allowable power of the battery is greater than the predetermined power. According to the above-described configuration, it is possible to determine whether or not the basic torque is able to be output from the second motor to the drive shaft at the time of starting the engine according to the magnitude relationship between the maximum allowable power of the battery and the predetermined power.

In the above-described hybrid vehicle, the electronic control unit may be configured to perform control such that the hybrid vehicle travels in one of a charge sustaining mode and a charge depleting mode. The electronic control unit may be configured to set the maximum allowable power such that the value of the maximum allowable power becomes a value of basic allowable power when the charge depleting mode is executed. The basic allowable power may be power based on a temperature and a power storage ratio of the battery. The electronic control unit may be configured to set the maximum allowable power such that the value of the maximum allowable power becomes a value obtained by limiting the basic allowable power with second predetermined power when the charge sustaining mode is executed. The second predetermined power may be power equal to or less than the predetermined power.

In the above-described hybrid vehicle, the electronic control unit may be configured to decrease an increase rate of the rotation speed of the engine during increasing the rotation speed of the engine after motoring of the engine by the first motor ends when the target motoring rotation speed is low compared to when the target motoring rotation speed is high. The increase rate of the rotation speed of the engine may be an increase rate per unit time of the rotation speed of the engine. According to the above-described configuration, when the target motoring rotation speed is made lower, it is possible to increase torque (so-called directly transmitted torque) output to the drive shaft through the planetary gear device with torque from the engine and torque from the first motor at the time of increasing the rotation speed of the engine after motoring control ends. As a result, it is possible to prevent a driver from feeling a sense of slowness.

In the above-described hybrid vehicle, the electronic control unit may be configured to decrease an increase rate of the rotation speed of the engine during increasing the rotation speed of the engine after motoring of the engine by the first motor ends when the motoring time is short compared to when the motoring time is long. The increase rate of the rotation speed of the engine may be an increase rate per unit time of the rotation speed of the engine. According to the above-described configuration, when the target motoring rotation speed is made lower or the motoring time is made shorter, it is possible to increase torque (so-called directly transmitted torque) output to the drive shaft through the planetary gear device with torque from the engine and torque from the first motor at the time of increasing the rotation speed of the engine after motoring control ends. As a result, it is possible to prevent a driver from feeling a sense of slowness.

A second aspect of the disclosure is a control method for a hybrid vehicle. The hybrid vehicle includes an engine, a first motor, a drive shaft, a planetary gear device, a second motor, a battery, and an electronic control unit. The drive shaft is coupled to the first motor and an axle. The planetary gear device includes at least one planetary gear. The planetary gear device includes rotating elements. The rotating elements are connected to the engine and the drive shaft such that the first motor, the engine, and the drive shaft are arranged in this order in a collinear diagram. The second motor is mechanically coupled to the drive shaft. The battery is configured to exchange electric power with the first motor and the second motor. The control method includes: allowing, by the electronic control unit, motoring torque for motoring the engine to be output from the first motor during starting the engine; allowing, by the electronic control unit, post-limitation torque to be output from the second motor to the drive shaft; and performing, by the electronic control unit, one of first control and second control when basic torque is unable to be output from the second motor to the drive shaft. The post-limitation torque is torque obtained by limiting the basic torque such that charge and discharge power of the battery is within a range of maximum allowable power of the battery and torque from the second motor is within a range of rated torque of the second motor. The basic torque is the sum of required torque and cancel torque. The required torque is torque required for the drive shaft. The cancel torque is torque for cancelling torque applied to the drive shaft with the output of the motoring torque from the first motor. The first control is control for making a target motoring rotation speed lower than when the basic torque is output from the second motor to the drive shaft. The target motoring rotation speed is a rotation speed of the engine for ending the output of the motoring torque from the first motor. The second control is control for making a motoring time shorter than when the basic torque is output from the second motor to the drive shaft. The motoring time is a time for outputting the motoring torque from the first motor.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a flowchart showing an example of a start threshold setting routine;

FIG. 6 is an explanatory view showing an example of a collinear diagram of the planetary gear 30 at the time of starting an engine 22 from a state of traveling in EV traveling;

FIG. 14 is a flowchart showing an example of the control value setting routine;

FIG. 15 is a configuration diagram showing the outline of the configuration of a hybrid vehicle 120 of a modification example;

DETAILED DESCRIPTION OF EMBODIMENTS

Next, a mode for carrying out the disclosure will be described in connection with an example.

Figure 1:
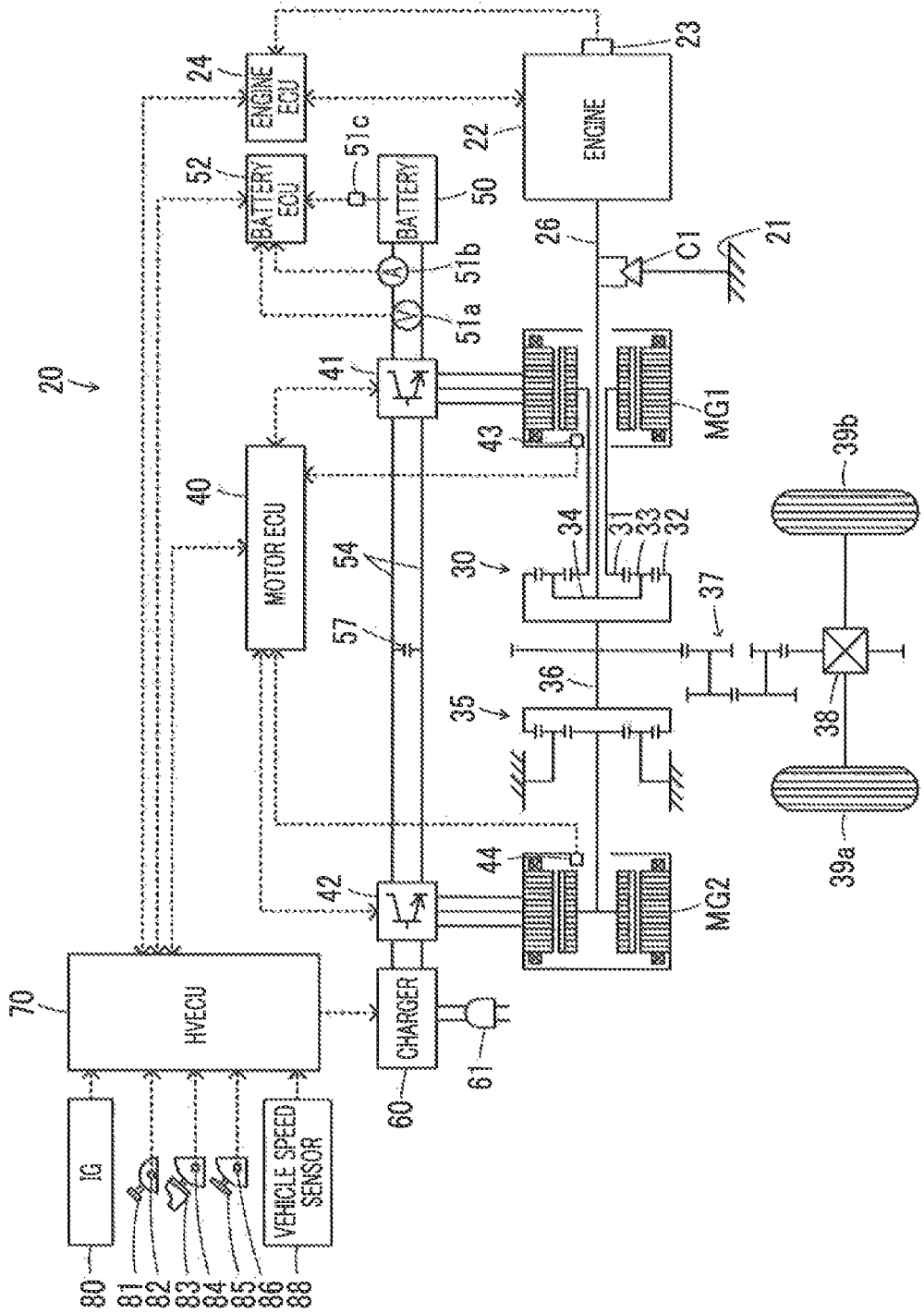
FIG. 1 is a configuration diagram showing the outline of the configuration of a hybrid vehicle 20 as an example of the disclosure.

FIG. 1 is a configuration diagram showing the outline of the configuration of a hybrid vehicle 20 as an example of the disclosure. As shown in FIG. 1, the hybrid vehicle 20 of the example includes an engine 22, a planetary gear 30 as a planetary gear device, a one-way clutch C1, motors MG1, MG2, inverters 41, 42, a battery 50, a charger 60, and a hybrid electronic control unit (hereinafter, referred to as an "HVECU") 70.

The engine 22 is constituted as an internal combustion engine which outputs power with gasoline, diesel, or the like as fuel. The engine 22 is operated and controlled by an engine electronic control unit (hereinafter, referred to as an "engine ECU") 24.

Though not shown, the engine ECU 24 is constituted as a microcomputer centering on a CPU, and includes, in addition to the CPU, a ROM which stores a processing program, a RAM which temporarily stores data, an input/output port, and a communication port.

Signals from various sensors necessary for operating and controlling the engine 22 are input to the engine ECU 24 through the input port. As the signals input to the engine ECU 24, the following signals are exemplified: a crank angle θcr from a crank position sensor 23 which detects the rotation position of a crank shaft 26 of the engine 22; and a throttle opening TH from a throttle valve position sensor which detects the position of a throttle valve.

Various control signals for operating and controlling the engine 22 are output from the engine ECU 24 through the output port. As the signals output from the engine ECU 24, the following signals are exemplified: a drive control signal to a throttle motor which adjusts the position of the throttle valve; a drive control signal to a fuel injection valve; and a drive control signal to an ignition coil integrated with an igniter.

The engine ECU 24 is connected to the HVECU 70 through the communication port, operates and controls the engine 22 in response to a control signal from the HVECU 70, and outputs data relating to an operation state of the engine 22 to the HVECU 70 as necessary. The engine ECU 24 calculates a rotation speed of the crank shaft 26, that is, a rotation speed Ne of the engine 22, based on the crank angle θcr from the crank position sensor 23.

The planetary gear 30 is constituted as a single pinion type planetary gear (planetary gear). The planetary gear 30 has a sun gear 31 as an external gear, a ring gear 32 as an internal gear, a plurality of pinion gears 33 which mesh with the sun gear 31 and the ring gear 32, and a carrier 34 which holds a plurality of pinion gears 33 rotatably and revolvably. A rotor of the motor MG1 is connected to the sun gear 31. A drive shaft 36 coupled to drive wheels 39a, 39b through a differential gear 38 and a gear mechanism 37 is connected to the ring gear 32. The crank shaft 26 of the engine 22 is connected to the carrier 34.

The one-way clutch C1 is attached to the crank shaft 26 of the engine 22 (the carrier 34 of the planetary gear 30) and a case 21 fixed to a vehicle body. The one-way clutch C1 permits the positive rotation of the engine 22 with respect to the case 21 and regulates (inhibits) the negative rotation of the engine 22 with respect to the case 21.

The motor MG1 is constituted as, for example, a synchronous motor generator, and as described above, has the rotor connected to the sun gear 31 of the planetary gear 30. The motor MG2 is constituted as, for example, a synchronous motor generator, and has a rotor connected to the drive shaft 36 through a reduction gear 35. The inverters 41, 42 are connected to a power line 54 along with the battery 50. A smoothing capacitor 57 is attached to the power line 54. The motors MG1, MG2 are rotationally driven when a plurality of switching elements (not shown) of the inverters 41, 42 are switched by a motor electronic control unit (hereinafter, referred to as a "motor ECU") 40.

Though not shown, the motor ECU 40 is constituted as a microprocessor centering on a CPU, and includes, in addition to the CPU, a ROM which stores a processing program, a RAM which temporarily stores data, an input/output port, and a communication port.

Signals from various sensors necessary for driving and controlling the motors MG1, MG2 are input to the motor ECU 40 through the input port. As the signals input to the motor ECU 40, the following signals are exemplified: rotation positions θm1, θm2 from rotation position detection sensors 43, 44 which detect the rotation positions of the rotors of the motors MG1, MG2; and phase currents from a current sensor which detects currents flowing in the respective phases of the motors MG1, MG2.

A switching control signal or the like to the switching elements (not shown) of the inverters 41, 42 is output from the motor ECU 40 through the output port.

The motor ECU 40 is connected to the HVECU 70 through the communication port. The motor ECU 40 drives and controls the motors MG1, MG2 in response to a control signal from the HVECU 70. The motor ECU 40 outputs data relating to the drive states of the motors MG1, MG2 to the HVECU 70 as necessary. The motor ECU 40 calculates rotation speeds Nm1, Nm2 of the motors MG1, MG2 based on the rotation positions θm1, θm2 of the rotors of the motors MG1, MG2 from the rotation position detection sensors 43, 44.

The battery 50 is constituted as, for example, a lithium-ion secondary battery or a nickel-hydrogen secondary battery, and as described above, is connected to the power line 54 along with the inverters 41, 42. The battery 50 is managed by a battery electronic control unit (hereinafter, referred to as a "battery ECU") 52.

Though not shown, the battery ECU 52 is constituted as a microprocessor centering on a CPU, and includes, in addition to the CPU, a ROM which stores a processing program, a RAM which temporarily stores data, an input/output port, and a communication port.

Signals from various sensors necessary for managing the battery 50 are input to the battery ECU 52 through the input port. As the signals input the battery ECU 52, the following signals are exemplified: a battery voltage Vb from a voltage sensor 51a provided between terminals of the battery 50; a battery current Ib (a positive value when discharged from the battery 50) from a current sensor 51b attached to an output terminal of the battery 50; and a battery temperature Tb from a temperature sensor 51c attached to the battery 50.

The battery ECU 52 is connected to the HVECU 70 through the communication port. The battery ECU 52 outputs data relating the state of the battery 50 to the HVECU 70 as necessary. The battery ECU 52 calculates a power storage ratio SOC based on an integrated value of the battery current Ib from the current sensor 51b. The power storage ratio SOC is the ratio of the capacity of electric power dischargeable from the battery 50 to the total capacity of the battery 50. The battery ECU 52 calculates an output limitation value Wout based on the calculated power storage ratio SOC, the battery temperature Tb from the temperature sensor 51c, and one mode of a charge depleting (CD) mode and a charge sustaining (CS) mode. The output limitation value Wout is maximum allowable power (electric power) which is allowed to be discharged from the battery 50.

The CD mode is a mode in which, out of hybrid traveling (HV traveling) and electric traveling (EV traveling), EV traveling is given priority over the CS mode. The HV traveling is a mode in which traveling is performed while operating the engine 22 with bringing the carrier 34 of the planetary gear 30 (engine 22) into a rotation state. The EV traveling is a mode in which traveling is performed with at least torque from the motor MG2 without operating the engine 22 with bringing the carrier 34 of the planetary gear 30 (engine 22) into a rotation stop state.

In regard to the output limitation value Wout of the battery 50, when the CD mode is executed, basic allowable power Wouttmp based on the power storage ratio SOC and the battery temperature Tb is set. In regard to the output limitation value Wout of the battery 50, it is assumed that, when the CS mode is executed, a value obtained by limiting (upper limit guard) the basic allowable power Wouttmp with predetermined power W1 sufficiently smaller than rated power Pm2rt of the motor MG2 is set. In regard to the basic allowable power Wouttmp, when the battery temperature Tb and the power storage ratio SOC is within a normal range, rated power Woutrt of the battery 50 is set. In regard to the basic allowable power Wouttmp, it is assumed that, when the battery temperature Tb or the power storage ratio SOC is out of the normal range, the farther the battery temperature Tb or the power storage ratio SOC is separated from the normal range, the smaller the rated power Woutrt is set. The normal range can be, for example, a range in which the battery temperature Tb is equal to or higher than a threshold Tblo (for example, 5° C., 10° C., 15° C., or the like) and equal to or less than a threshold Tbhi (for example, 40° C., 45° C., 50° C., or the like) and the power storage ratio SOC is equal to or greater than a threshold Sref (for example, 20%, 25%, 30%, or the like), or the like. In the example, in regard to the motor MG2, a motor having the rated power Pm2rt of, for example, 53 kW, 55 kW, 57 kW, or the like is used. In regard to the battery 50, a battery having the rated power Woutrt of, for example, 60 kW, 65 kW, 70 kW, or the like greater than the rated power Pm2rt of the motor MG2 is used. As the predetermined power W1, for example, 22 kW, 24 kW, 26 kW, or the like can be used.

The charger 60 is connected to a power line 54, and includes an AC/DC converter and a DC/DC converter. The AC/DC converter converts AC electric power supplied from an external power supply through a power supply plug 61 to DC electric power. The DC/DC converter converts a voltage of the DC electric power to the AC/DC converter and supplies the resultant voltage to the battery 50 side. When the power supply plug 61 is connected to an external power supply, such as a household power supply, the AC/DC converter and the DC/DC converter are controlled by the HVECU 70, whereby the charger 60 supplies electric power from the external power supply to the battery 50.

Though not shown, the HVECU 70 is constituted as a microprocessor centering on a CPU, and includes, in addition to the CPU, a ROM which stores a processing program, a RAM which temporarily stores data, an input/output port, and a communication port.

Signals from various sensors are input to the HVECU 70 through the input port. As the signals input to the HVECU 70, the following signals are exemplified: an ignition signal from an ignition switch 80; a shift position SP from a shift position sensor 82 which detects an operation position of a shift lever 81; an accelerator pedal angle Acc from an accelerator pedal position sensor 84 which detects the amount of depression of an accelerator pedal 83; a brake pedal position BP from a brake pedal position sensor 86 which detects the amount of depression of a brake pedal 85; and a vehicle speed V from a vehicle speed sensor 88.

A control signal to the charger 60 and the like are output from the HVECU 70 through the output port.

As described above, the HVECU 70 is connected to the engine ECU 24, the motor ECU 40, and the battery ECU 52 through the communication port, and performs exchange of various control signals or data with the engine ECU 24, the motor ECU 40, and the battery ECU 52.

In the hybrid vehicle 20 of the example configured as above, traveling is performed by HV traveling or EV traveling in the CD mode or the CS mode. The EV traveling includes single-drive in which traveling is performed only with torque from the motor MG2, and dual-drive in which traveling is performed with torque from the motor MG1 and the motor MG2.

In the example, when the power storage ratio SOC of the battery 50 is greater than a threshold Shv1 (for example, 45%, 50%, 55%, or the like) at the time of system start, the hybrid vehicle 20 travels in the CD mode until the power storage ratio SOC of the battery 50 becomes equal to or less than a threshold Shv2 (for example, 25%, 30%, 35%, or the like), and travels in the CS mode until the system is stopped after the power storage ratio SOC of the battery 50 becomes equal to or less than the threshold Shv2. When the power storage ratio SOC of the battery 50 is equal to or less than the threshold Shv1 at the time of system start, the hybrid vehicle 20 travels in the CS mode until the system is stopped. If the power supply plug 61 is connected to the external power supply when the system is stopped at a charging point, such as home, the battery 50 is charged using electric power from the external power supply by controlling the charger 60.

In the HV traveling and the EV traveling (single-drive and dual-drive), the engine 22 and the motors MG1, MG2 are controlled through cooperative control of the HVECU 70, the engine ECU 24, and the motor ECU 40. Hereinafter, description will be provided in order of the EV traveling (single-drive and dual-drive) and the HV traveling.

Figure 2:
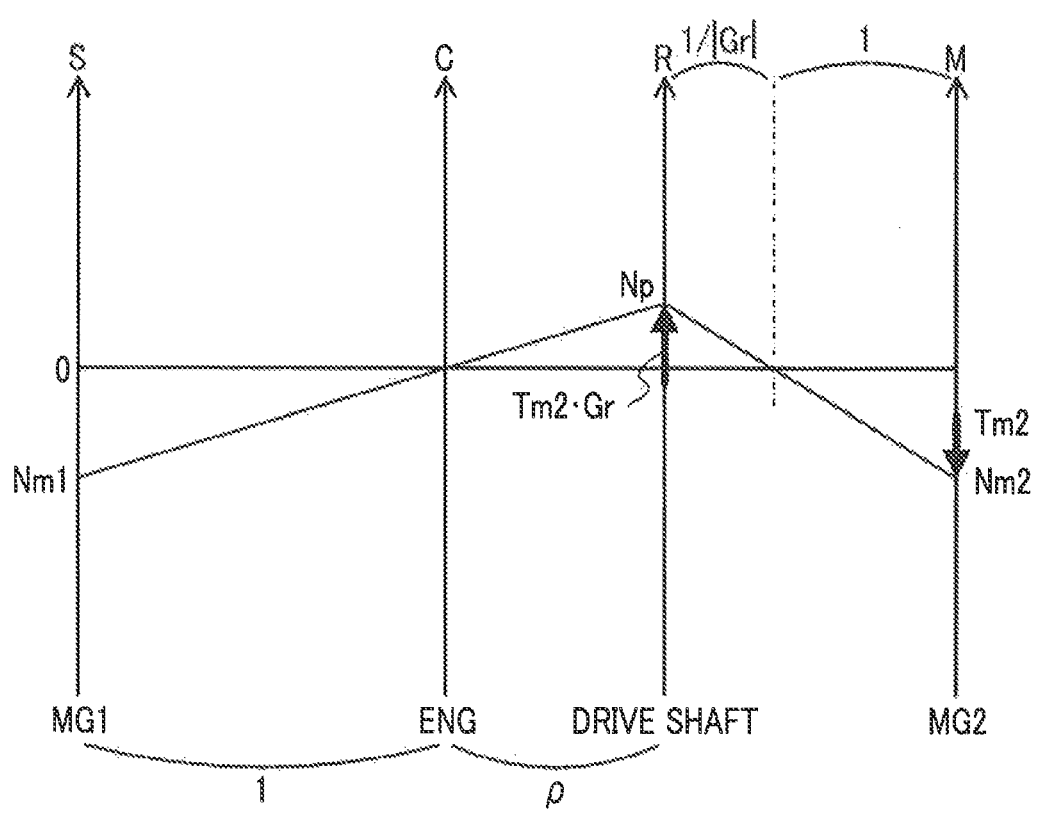
FIG. 2 is an explanatory view showing an example of a collinear diagram of a planetary gear 30 during traveling in single-drive.
Figure 3:
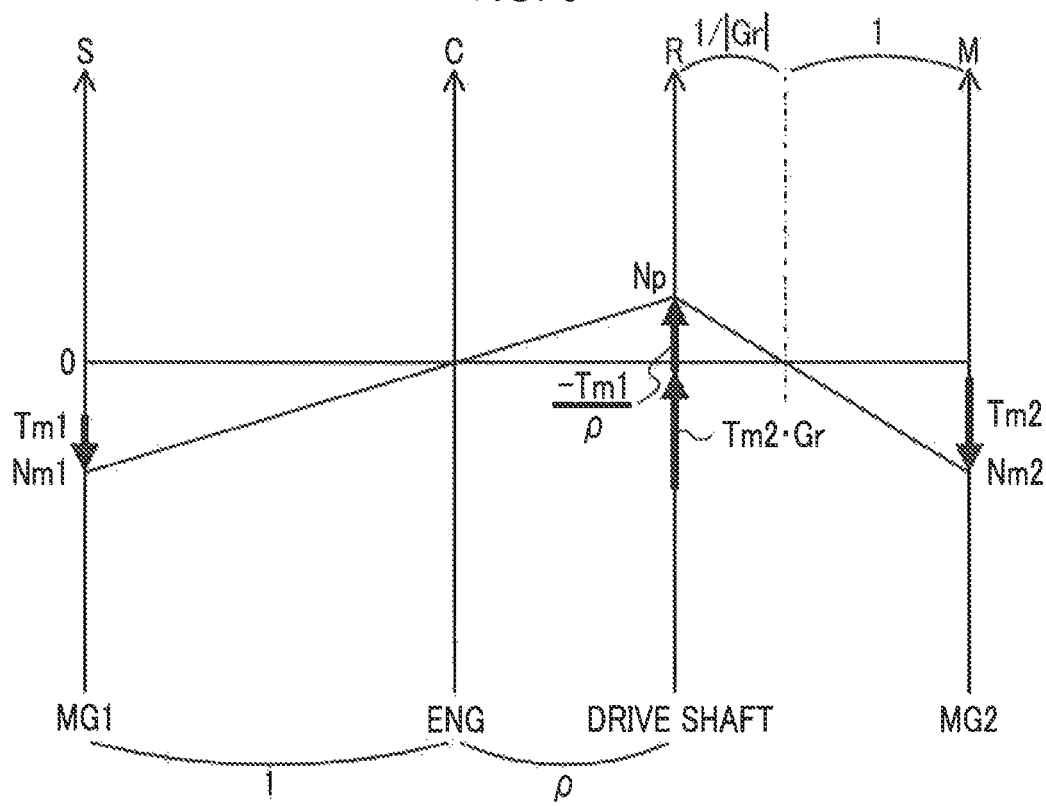
FIG. 3 is an explanatory view showing an example of a collinear diagram of the planetary gear 30 during traveling in dual-drive.

FIGS. 2 and 3 are respectively explanatory views showing an example of a collinear diagram of the planetary gear 30 during traveling in single-drive and dual-drive. In FIGS. 2 and 3, an S axis indicates the rotation speed of the sun gear 31 and a rotation speed Nm1 of the motor MG1, a C axis indicates the rotation speed of the carrier 34 and the rotation speed Ne of the engine 22, an R axis indicates the rotation speed of the ring gear 32 and a rotation speed Np of the drive shaft 36, and an M axis indicates the rotation speed of a gear before reduction of the reduction gear 35 and a rotation speed Nm2 of the motor MG2. "ρ" indicates a gear ratio (the number of teeth of the sun gear 31/the number of teeth of the ring gear 32) of the planetary gear 30, and "Gr" indicates a reduction ratio of the reduction gear 35. In FIG. 2, a bold arrow on the M axis indicates torque Tm2 which is output from the motor MG2, and a bold arrow on the R axis indicates torque (Tm2·Gr) which is output from the motor MG2 and is applied to the drive shaft 36. In FIG. 3, a bold arrow on the S axis indicates torque Tm1 which is output from the motor MG1, a bold arrow on the M axis indicates torque Tm2 which is output from the motor MG2, and two bold arrows on the R axis indicate torque (−Tm1/ρ+ Tm2*Gr) which is applied to the drive shaft 36 when the torque Tm1, Tm2 are output from the motors MG1, MG2.

Hereinafter, in the collinear diagram, in regard to the rotation speed, an upper side than a value of 0 of FIGS. 2 and 3 is defined as positive rotation and a lower side than the value of 0 of FIGS. 2 and 3 is defined as negative rotation, and in regard to torque, an upward side of FIGS. 2 and 3 is defined as positive and a downward side of FIGS. 2 and 3 is defined as negative. In this case, since the rotation speed Nm2 of the motor MG2 is different in sign from the rotation speed Np of the drive shaft 36, the reduction ratio Gr of the reduction gear 35 has a negative value.

During traveling in the EV traveling, the HVECU 70 first sets required torque Tp* required for traveling (required for the drive shaft 36) based on the accelerator pedal angle Acc and the vehicle speed V. The HVECU 70 calculates required power Pp* required for traveling (required for the drive shaft 36) by multiplying the required torque Tp* by the rotation speed Np of the drive shaft 36. As the rotation speed Np of the drive shaft 36, for example, a rotation speed obtained by dividing the rotation speed Nm2 of the motor MG2 by the reduction ratio Gr of the reduction gear 35, a rotation speed obtained by multiplying the vehicle speed V by a conversion coefficient, or the like can be used.

Figure 4:
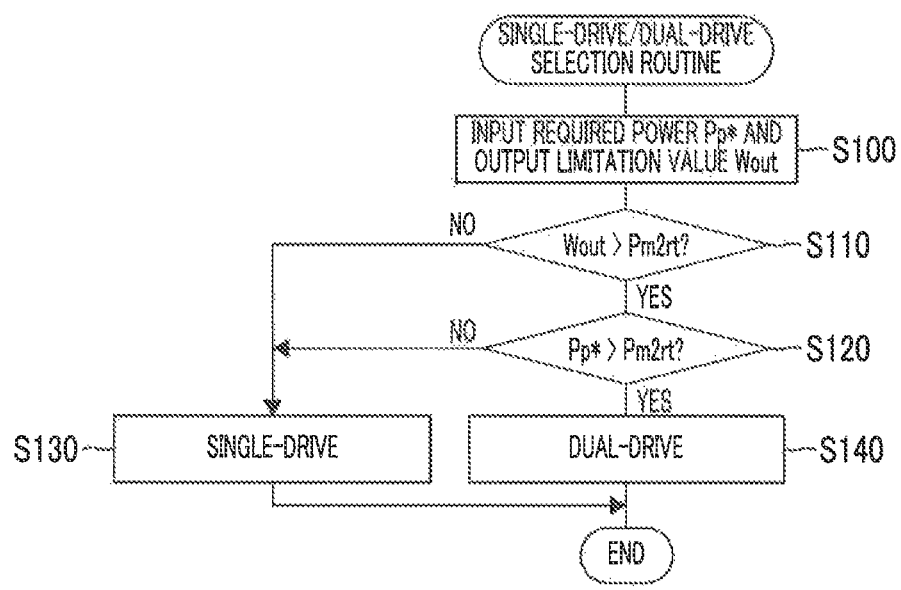
FIG. 4 is a flowchart showing an example of a single-drive/dual-drive selection routine.

Subsequently, through a single-drive/dual-drive selection routine of FIG. 4, single-drive or dual-drive is selected. This routine is repeatedly executed during the EV traveling. If the single-drive/dual-drive selection routine of FIG. 4 is executed, the HVECU 70 inputs the output limitation value Wout of the battery 50 and the required power Pp* (Step S100). Subsequently, the HVECU 70 compares the output limitation value Wout of the battery 50 with the rated power Pm2rt of the motor MG2 (Step S110), and compares the required power Pp* with the rated power Pm2rt of the motor MG2 (Step S120).

In Steps S110 and S120, when the output limitation value Wout of the battery 50 is equal to or less than the rated power Pm2rt of the motor MG2 or when the required power Pp* is equal to or less than the rated power Pm2rt of the motor MG2, single-drive is selected (Step S130), and this routine ends.

In Steps S110 and S120, when the output limitation value Wout of the battery 50 is greater than the rated power Pm2rt of the motor MG2 and the required power Pp* is greater than the rated power Pm2rt of the motor MG2, dual-drive is selected (Step S140), and this routine ends.

When the CS mode is executed, since the output limitation value Wout of the battery 50 becomes equal to or less than the predetermined power W1 smaller than the rated power Pm2rt of the motor MG2, single-drive is selected regardless of the required power Pp*.

When the CD mode is executed, the output limitation value Wout of the battery 50 becomes equal to or less than rated power W2 greater than the rated power Pm2rt of the motor MG2. Accordingly, when the output limitation value Wout of the battery 50 is equal to or less than the rated power Pm2rt of the motor MG2, single-drive is selected regardless of the required power Pp*. In contrast, when the output limitation value Wout of the battery 50 is greater than the rated power Pm2rt of the motor MG2, single-drive or dual-drive is selected according to the magnitude relationship between the required power Pp* and the rated power Pm2rt of the motor MG2.

When single-drive is selected, a torque command Tm1* of the motor MG1 is set to a value of 0. As shown in Expression (1), a value obtained by dividing the required torque Tp* by the reduction ratio Gr of the reduction gear 35 is set to temporary torque Tm2tmp as a temporary value of a torque command Tm2* of the motor MG2. Subsequently, as shown in Expression (2), a torque limitation Tm2lim on the negative side (the downward side of FIG. 2) of the motor MG2 is calculated by dividing a value obtained by subtracting power Pm1 (a positive value when electric power is consumed) of the motor MG1 obtained as a product of the torque command Tm1* and the rotation speed Nm1 of the motor MG1 from the output limitation value Wout of the battery 50 by the rotation speed Nm2 of the motor MG2. Then, as shown in Expression (3), the torque command Tm2* of the motor MG2 is set by limiting (lower limit guard (as an absolute value, upper limit guard)) the temporary torque Tm2tmp of the motor MG2 with the torque limitation Tm2lim and rated torque Tm2rt on the negative side (the downward side of FIG. 2). The rated torque Tm2rt on the negative side of the motor MG2 basically corresponds to a value (negative value) obtained by dividing the rated power Pm2rt (given value) on a consumption side (positive side) of the motor MG2 by the rotation speed Nm2 of the motor MG2 when the rotation speed Nm2 of the motor MG2 is negative. Expression (3) is an expression for setting the torque command Tm2* by limiting the temporary torque Tm2tmp of the motor MG2 such that the charge/discharge power of the battery 50 is within the range of the output limitation value Wout and torque from the motor MG2 is within the range of the rated torque Tm2rt on the negative side. Then, the torque commands Tm1*, Tm2* of the motors MG1, MG2 are transmitted to the motor ECU 40. The motor ECU 40 performs switching control of a plurality of switching elements of the inverters 41, 42 such that the motors MG1, MG2 are driven with the torque commands Tm1*, Tm2*. With this, as shown in FIG. 2, the negative torque Tm2 is output from the motor MG2 to apply positive torque (Tm2·Gr) to the drive shaft 36, thereby performing traveling.

$$Tm2\text{tmp}=Tp^*/Gr \quad (1)$$

$$Tm2\text{lim}=(W\text{out}-Tm1^*\cdot Nm1)/Nm2 \quad (2)$$

$$Tm2^*=\max(Tm2\text{tmp}, Tm2\text{lim}, Tm2\text{rt}) \quad (3)$$

When dual-drive is selected, the rated torque Tm2rt on the negative side (the downward side of FIG. 3) of the motor MG2 is set to the torque command Tm2* of the motor MG2. As shown in Expression (4), temporary torque Tm1tmp as a temporary value of the torque command Tm1* of the motor MG1 is calculated by multiplying a value obtained subtracting a value obtained by multiplying the rated torque Tm2rt of the motor MG2 by the reduction ratio Gr of the reduction gear 35 from the required torque Tp* by the gear ratio ρ of the planetary gear 30 and a value (−1). Expression (4) can be easily derived from the collinear diagram of FIG. 3. Subsequently, as shown in Expression (5), a torque limitation Tm1lim on the negative side (a downward side of FIG. 3) of the motor MG1 is calculated by dividing a value obtained by subtracting power Pm2 (a positive value when electric power is consumed) of the motor MG2 obtained as a product of the torque command Tm2* and the rotation speed Nm2 of the motor MG2 from the output limitation value Wout of the battery 50 by the rotation speed Nm1 of the motor MG1. Then, as shown in Expression (6), the torque command Tm1* of the motor MG2 is set by limiting (lower limit guard (as an absolute value, upper limit guard)) the temporary torque Tm1tmp of the motor MG1 with the torque limitation Tm1lim and the rated torque Tm1rt on the negative side (the downward side of FIG. 3). Expression (6) is an expression for setting the torque command Tm1* by limiting the temporary torque Tm1tmp of the motor MG1 such that the charge/discharge power of the battery 50 is within the range of the output limitation value Wout and torque from the motor MG1 is within the range of the rated torque Tm1rt. Then, the torque commands Tm1*, Tm2* of the motors MG1, MG2 are transmitted to the motor ECU 40. The motor ECU 40 performs switching control of a plurality of switching elements of the inverters 41, 42 as described above. With this, as shown in FIG. 3, the negative torque Tm1, Tm2 are output from the motors MG1, MG2 to apply positive torque (−Tm1/ρ+Tm2·Gr) of the drive shaft 36, thereby performing traveling.

$$Tm1\text{tmp}=-(Tp^*-Tm2\text{rt}\cdot Gr)\cdot\rho \quad (4)$$

$$Tm1\text{lim}=(W\text{out}-Tm2^*\cdot Nm2)/Nm1 \quad (5)$$

$$Tm1^*=\max(Tm1\text{tmp}, Tm1\text{lim}, Tm1\text{rt}) \quad (6)$$

During traveling in the HV traveling, the HVECU 70 first sets the required torque Tp* and the required power Pp* like traveling in the EV traveling. Subsequently, the HVECU 70 calculates required power Pe* required for the vehicle by subtracting charge/discharge required power Pb* (a positive value when electric power is discharged from the battery 50) of the battery 50 from the required power Pp*. Then, the required power Pe* is output from the engine 22, and a target rotation speed Ne* and target torque Te* of the engine 22 and the torque commands Tm1*, Tm2* of the motors MG1, MG2 are set such that the required torque Tp* is output to the drive shaft 36 within the ranges of the output limitation value Wout of the battery 50 and the rated torque Tm1rt, Tm2rt on the negative side (the downward side of FIGS. 2 and 3) of the motors MG1, MG2. Then, the target rotation speed Ne* and the target torque Te* of the engine 22 are transmitted to the engine ECU 24, and the torque commands Tm1*, Tm2* of the motors MG1, MG2 are transmitted to the motor ECU 40. If the target rotation speed Ne* and the target torque Te* are received from the HVECU 70, the engine ECU 24 performs intake air amount control, fuel injection control, ignition control, and the like of the engine 22 such that the engine 22 is operated based on the target rotation speed Ne* and the target torque Te*. The motor ECU 40 performs switching control of a plurality of switching elements of the inverters 41, 42 as described above.

In the hybrid vehicle 20 of the example, during traveling in the EV traveling (single-drive or dual-drive), when the required power Pp* becomes greater than a start threshold Pst of the engine 22, the engine 22 is started according to motoring of the engine 22 by the motor MG1, thereby making transition to the HV traveling.

The start threshold Pst is set through a start threshold setting routine of FIG. 5. This routine is repeatedly executed during the EV traveling. If the start threshold setting routine of FIG. 5 is executed, the HVECU 70 determines whether the CD mode is executed or the CS mode is executed (Step S200). Then, when the CS mode is executed, a value (Wout−α1) which is smaller than the output limitation value Wout of the battery 50 by a predetermined value α1 is set to the start threshold Pst (Step S210), and this routine ends. When the CD mode is executed, a value (Wout+α2) which is greater than the output limitation value Wout of the battery 50 by a predetermined value α2 is set to the start threshold Pst (Step S220), and this routine ends. As the predetermined values α1, α2, for example, 3 kW, 5 kW, 7 kW, or the like can be used.

When the CS mode is executed, the value (Wout−α1) is set to the start threshold Pst, whereby it is possible to suppress a decrease in the power storage ratio SOC of the battery 50 due to the continuation of traveling in the EV traveling compared to a case where the output limitation value Wout of the battery 50 or a value greater than the output limitation value Wout of the battery 50 is set to the start threshold Pst. As described above, when the CS mode is executed, since only single-drive is selected in the EV traveling, the engine 22 is started from single-drive when the required power Pp* becomes greater than the start threshold Pst.

When the CD mode is executed, the value (Wout+α2) is set to the start threshold Pst, whereby it is possible to further suppress the start of the engine 22 compared to a case where the output limitation value Wout of the battery 50 or a value smaller than the output limitation value Wout of the battery 50 is set to the start threshold Pst. When the output limitation value Wout of the battery 50 is equal to or less than the rated power Pm2rt of the motor MG2 in the CD mode, since only single-drive is selected in the EV traveling, the engine 22 is started from single-drive when the required power Pp* becomes greater than the start threshold Pst. In contrast, when the output limitation value Wout of the battery 50 is greater than the rated power Pm2rt of the motor MG2 in the CD mode, since dual-drive is selected in the EV traveling when the required power Pp* is greater than the rated power Pm2rt of the motor MG2 and the start threshold Pst is greater than the rated power Pm2rt of the motor MG2, the engine 22 is started from dual-drive when the required power Pp* becomes greater than the start threshold Pst.

FIG. 6 is an explanatory view showing an example of a collinear diagram of the planetary gear 30 at the time of starting the engine 22 from a state of traveling in the EV traveling. At this time, the HVECU 70 first sets the required torque Tp* and the required power Pp* like traveling in the EV traveling. Subsequently, motoring torque Tcr for motoring the engine 22 is set to the torque command Tm1* of the motor MG1. Next, as shown in Expression (7), the temporary torque Tm2tmp of the motor MG2 is calculated by dividing basic torque (Tp*+Tcn), which is the sum of the required torque Tp* and cancel torque Tcn (=Tm1*/ρ) for cancelling torque (−Tm1* ρ) applied to the drive shaft 36 with the output of the torque command Tm1* (=Tcr) from the motor MG1, by the reduction ratio Gr of the reduction gear 35. Expression (7) can be easily derived from the collinear diagram of FIG. 6. Subsequently, the torque limitation Tm2lim on the negative side (the downward side of FIG. 6) of the motor MG2 is calculated by Expression (2) described above. Then, the torque command Tm2* of the motor MG2 is set by limiting (lower limit guard (as an absolute value, upper limit guard)) the temporary torque Tm2tmp of the motor MG2 with the torque limitation Tm2lim and the rated torque Tm2rt on the negative side (the downward side of FIG. 6) by Expression (3) described above. Then, the torque commands Tm1*, Tm2* of the motors MG1, MG2 are transmitted to the motor ECU 40. The motor ECU 40 performs switching control of a plurality of switching elements of the inverters 41, 42 as described above. As described above, Expression (3) is an expression for setting the torque command Tm2* by limiting the temporary torque Tm2tmp of the motor MG2 such that the charge/discharge power of the battery 50 is within the range of the output limitation value Wout and torque from the motor MG2 is within the range of the rated torque Tm2rt on the negative side. Accordingly, in this case, torque obtained by limiting the basic torque (Tp*+Tcn) such that the charge/discharge power of the battery 50 is within the range of the output limitation value Wout and torque from the motor MG2 is within the range of the rated torque Tm2rt on the negative side is output from the motor MG2 to the drive shaft 36.

$$Tm2\text{tmp}=(Tp^*+Tm1^*/\rho)/Gr \quad (7)$$

If the engine 22 is motored and the rotation speed Ne of the engine 22 reaches an operation start rotation speed Nest (for example, 500 rpm, 600 rpm, 700 rpm, or the like), the HVECU 70 transmits an operation start command of the engine 22 to the engine ECU 24. If the operation start command is received, the engine ECU 24 starts operation control (fuel injection control, ignition control, and the like) of the engine 22.

If the rotation speed Ne of the engine 22 reaches a target motoring rotation speed Necr* (a value Necr1 or a value Necr2 described below) higher than the operation start rotation speed Nest, the HVECU 70 determines that the start of the engine 22 is completed, and transmits a start completion command to the motor ECU 40. If the start completion command is received, the motor ECU 40 performs switching control of a plurality of switching elements of the inverters 41, 42 such that the output of the motoring torque Tcr from the motor MG1 ends and the output of the cancel torque Tcn from the motor MG2 to the drive shaft 36 ends. Then, traveling in the HV traveling is started.

Figure 7:
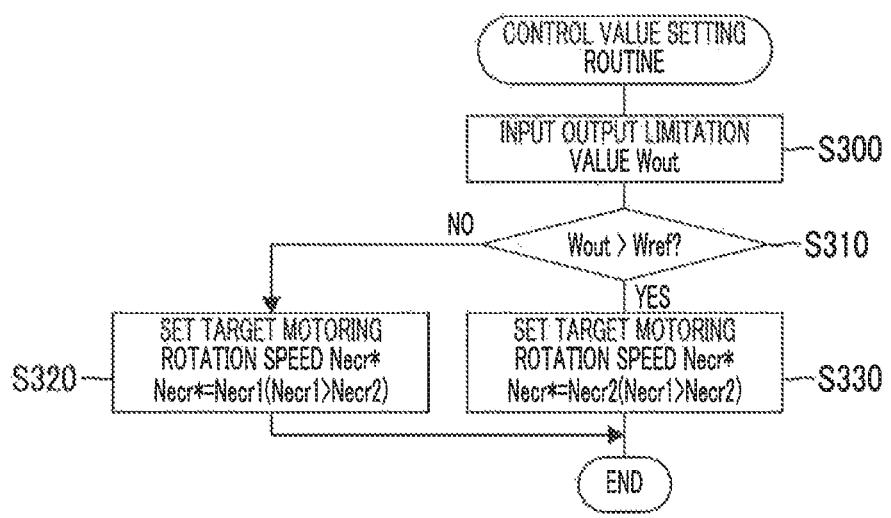
FIG. 7 is a flowchart showing an example of a control value setting routine.

Next, the operation of the hybrid vehicle 20 of the example configured as above, in particular, an operation at the time of setting the target motoring rotation speed Necr* will be described. FIG. 7 is a flowchart showing an example of a control value setting routine which is executed by the HVECU 70 of the example. This routine is executed when the required power Pp* becomes greater than the start threshold Pst (when motoring of the engine 22 by the motor MG1 is started).

If the control value setting routine of FIG. 7 is executed, the HVECU 70 inputs the output limitation value Wout of the battery 50 (Step S300), and compares the input output limitation value Wout of the battery 50 with a threshold Wref (Step S310). The threshold Wref is a threshold which is used to determine whether or not the above-described basic torque (Tp*+Tcn) is able to be output from the motor MG2 to the drive shaft 36 (the temporary torque Tm2tmp is able to be output from the motor MG2) at the time of starting the engine 22 (to predict before motoring of the engine 22 by the motor MG1 is started). As the threshold Wref, when the rated power Pm2rt of the motor MG2 is 53 kW, 55 kW, 57 kW, or the like as described above, for example, 43 kW, 45 kW, 47 kW, or the like can be used. The threshold Wref is greater than the above-described predetermined power W1.

As described above, when the required power Pp* becomes greater than the start threshold Pst during traveling in the EV traveling (single-drive or dual-drive), the engine 22 is started. When motoring of the engine 22 by the motor MG1 is started, as will be understood from FIG. 6, since the rotation speed Nm1 of the motor MG1 has a negative value and the torque command Tm1* (=Tcr) of the motor MG1 has a positive value, the motor MG1 generates electric power. Accordingly, electric power greater than the output limitation value Wout of the battery 50 is used for consumption of the motor MG2, whereby it is possible to drive the motor MG2 within the range of the rated power Pm2rt (rated torque Tm2rt).

When the output limitation value Wout of the battery 50 is comparatively small, since the start threshold Pst is comparatively small, it is considered that, at the time of starting the engine 22, the temporary torque Tm2tmp of the motor MG2 is within the range of the rated torque Tm2rt, and the basic torque (Tp*+Tcn) is able to be output from the motor MG2 to the drive shaft 36. In contrast, when the output limitation value Wout of the battery 50 is comparatively large (near or greater than the rated power Pm2rt of the motor MG2), since the start threshold Pst is comparatively large (near or greater than the rated power Pm2rt of the motor MG2), it is considered that, at the time of starting the engine 22, the temporary torque Tm2tmp of the motor MG2 is out of the range of the rated torque Tm2rt, and the basic torque (Tp*+Tcn) is unable to be output from the motor MG2 to the drive shaft 36.

When the CS mode is executed, the output limitation value Wout of the battery 50 becomes equal to or less than the threshold Wref. In contrast, when the CD mode is executed, the output limitation value Wout of the battery 50 may be equal to or less than the threshold Wref or may be greater than the threshold Wref. However, in the CD mode, at the time of starting the engine 22 from a state of traveling in dual-drive, since the output limitation value Wout of the battery 50 is greater than the rated power Pm2rt of the motor MG2, the output limitation value Wout of the battery 50 is of course greater than the threshold Wref.

In Step S310, when the output limitation value Wout of the battery 50 is equal to or less than the threshold Wref, it is determined that the basic torque (Tp*+Tcn) is able to be output from the motor MG2 to the drive shaft 36 at the time of starting the engine 22, and the value Necr1 is set to the target motoring rotation speed Necr* (Step S320). Then, this routine ends. As the target motoring rotation speed Necr*, a comparatively high rotation speed, for example, 1800 rpm, 2000 rpm, 2200 rpm, or the like can be used. In this case, the rotation speed Ne of the engine 22 is motored to the comparatively high target motoring rotation speed Necr* by the motor MG1, whereby it is possible to make torque (hereinafter, referred to as "directly transmitted torque") applied to the drive shaft 36 through the planetary gear 30 comparatively large with positive torque from the engine 22 and negative torque from the motor MG1 immediately after motoring of the engine 22 by the motor MG1 ends.

In Step S310, when the output limitation value Wout of the battery 50 is greater than the threshold Wref, it is determined that the basic torque (Tp*+Tcn) is unable to be output from the motor MG2 to the drive shaft 36 at the time of starting the engine 22, and the value Necr2 smaller than the value Necr1 is set to the target motoring rotation speed Necr* (Step S330). Then, this routine ends. As the value Necr2, for example, 900 rpm, 1000 rpm, 1100 rpm, or the like can be used. If the basic torque (Tp*+Tcn) is unable to be output from the motor MG2 to the drive shaft 36 at the time of starting the engine 22, torque output to the drive shaft 36 drops compared to before motoring of the engine 22 by the motor MG1 is started. If this state is continued for a comparatively long period of time, the driver is likely to feel a sense of failure in acceleration (a sense of torque loss). In the example, the target motoring rotation speed Necr* is decreased, whereby it is possible to reduce the time (hereinafter, referred to as a "motoring time") for which the motoring torque Tcr is output from the motor MG1, and to reduce the time for which torque output to the drive shaft 36 drops. As a result, it is possible to prevent the driver from feeling a sense of failure in acceleration (a sense of torque loss).

At the time of starting the engine 22 from a state of traveling in single-drive, as will be understood from FIGS. 2 and 6, since torque of the motor MG1 becomes positive from the value of 0, torque which is output from the motor MG1 and applied to the drive shaft 36 becomes negative from the value of 0. In contrast, at the time of starting the engine 22 from a state of traveling in dual-drive, as will be understood from FIGS. 3 and 6, since torque of the motor MG1 is reversed from negative to positive, torque which is output from the motor MG1 and applied to the drive shaft 36 is reversed from positive to negative. Accordingly, at the time of starting the engine 22 from dual-drive, the drop of torque output to the drive shaft 36 increases compared to at the time of starting the engine 22 from single-drive. For this reason, as a result of reducing the motoring time by decreasing the target motoring rotation speed Necr*, specifically, it is possible to make the effect of preventing the driver from feeling a sense of failure in acceleration (a sense of torque loss) more remarkable.

Figure 8:
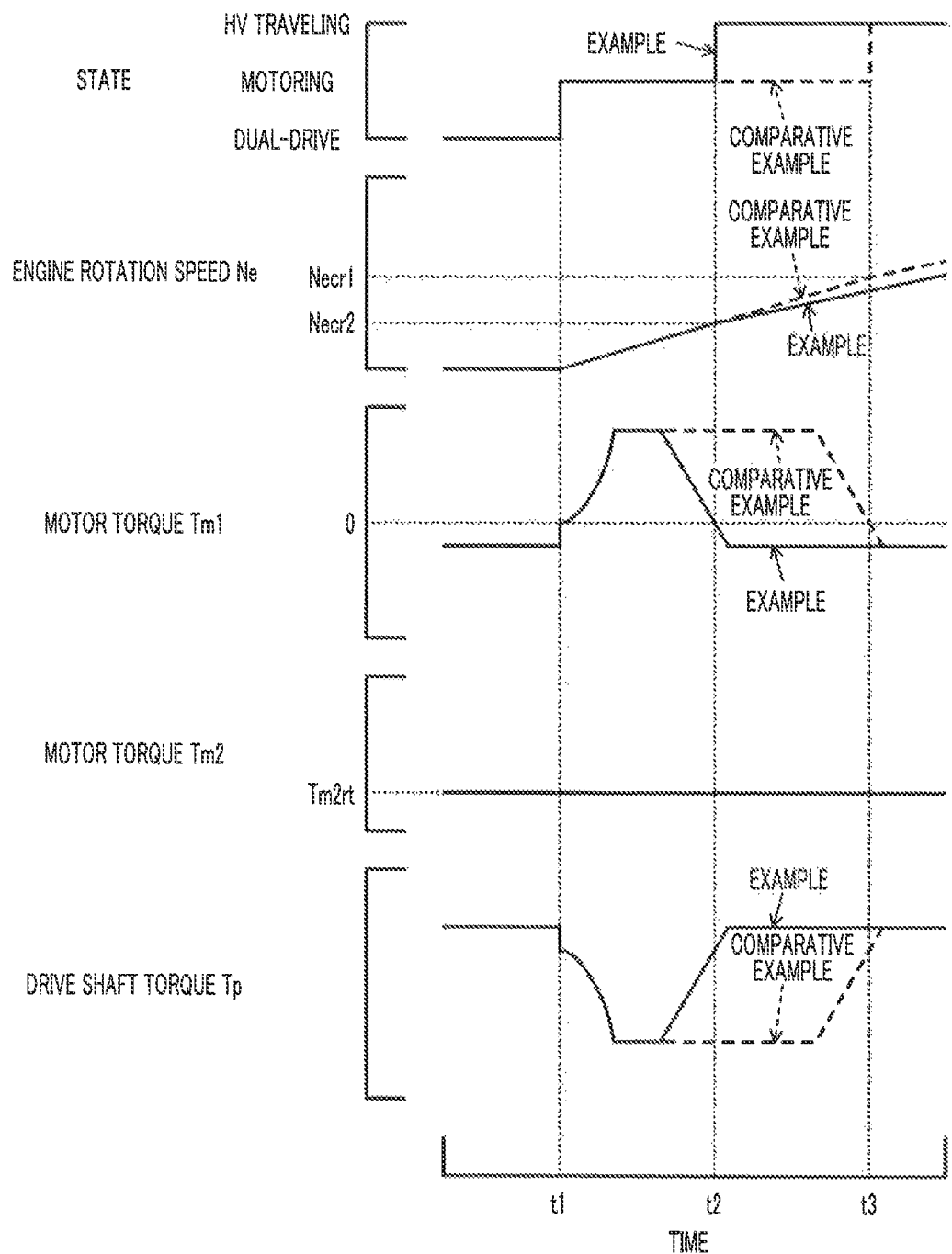
FIG. 8 is an explanatory view showing an example of a state at the time of starting the engine 22 from a state of traveling in dual-drive.

FIG. 8 is an explanatory view showing an example of a state at the time of starting the engine 22 from a state of traveling in dual-drive. In the drawing, in regards to others than the torque Tm2 of the motor MG2, a solid line indicates a state of the example, and a broken line indicates a state of a comparative example. Now, since when starting the engine 22 from a state of traveling in dual-drive is considered, the output limitation value Wout of the battery 50 is greater than the threshold Wref. As a comparative example in FIG. 8, a case where the target motoring rotation speed Necr* is set to the value Necr1 like when the output limitation value Wout of the battery 50 is equal to or less than the threshold Wref is considered. In a case of the comparative example, if the required power Pp* becomes greater than the start threshold Pst at a time t1 in a state of traveling in dual-drive, the engine 22 is motored by the motor MG1 until a time t3 at which the rotation speed Ne of the engine 22 reaches the value Necr1. In contrast, in a case of the example, if the required power Pp* becomes greater than the start threshold Pst at the time t1 in a state of traveling in dual-drive, the engine 22 is motored by the motor MG1 until a time t2 at which the rotation speed Ne of the engine 22 reaches the value Necr2 smaller than the value Necr1. With this, it is possible to reduce the time for which the drop of the torque Tp of the drive shaft 36 occurs, and to prevent the drive from feeling a sense of failure in acceleration (a sense of torque loss). In both cases of the example and the comparative example, the operation of the engine 22 is started between the time t1 and the time t2.

In the hybrid vehicle 20 of the example described above, when the basic torque (Tp*+Tcn) is unable to be output from the motor MG2 to the drive shaft 36 at the time of starting the engine 22, the target motoring rotation speed Necr* is decreased (set to the value Necr2 smaller than the value Necr1) compared to when the basic torque (Tp*+Tcn) is able to be output from the motor MG2 to the drive shaft 36. With this, it is possible to reduce the motoring time, and to reduce the time for which torque output to the drive shaft 36 drops. As a result, it is possible to prevent the driver from feeling a sense of failure in acceleration (a sense of torque loss).

In the hybrid vehicle 20 of the example, the determination about whether or not the basic torque (Tp*+Tcn) is able to be output from the motor MG2 to the drive shaft 36 at the time of starting the engine 22 is performed by comparison the output limitation value Wout of the battery 50 with the threshold Wref. With this, it is possible to easily perform the determination.

In the hybrid vehicle 20 of the example, the values Necr1, Necr2 (Necr1>Necr2) are set to the target motoring rotation speed Necr* respectively when the basic torque (Tp*+Tcn) is able to be output from the motor MG2 to the drive shaft 36 at the time of starting the engine 22 and when the basic torque (Tp*+Tcn) is unable to be output from the motor MG2 to the drive shaft 36, and the motoring torque Tcr is output from the motor MG1 until the rotation speed Ne of the engine 22 reaches the target motoring rotation speed Necr*. However, values tcr1, tcr2 (tcr1>tcr2) may be set to a motoring time tcr respectively when the basic torque (Tp*+Tcn) is able to be output from the motor MG2 to the drive shaft 36 at the time of starting the engine 22 and when the basic torque (Tp*+Tcn) is unable to be output from the motor MG2 to the drive shaft 36, and the motoring torque Tcr may be output from the motor MG1 for the motoring time tcr.

Figure 9:
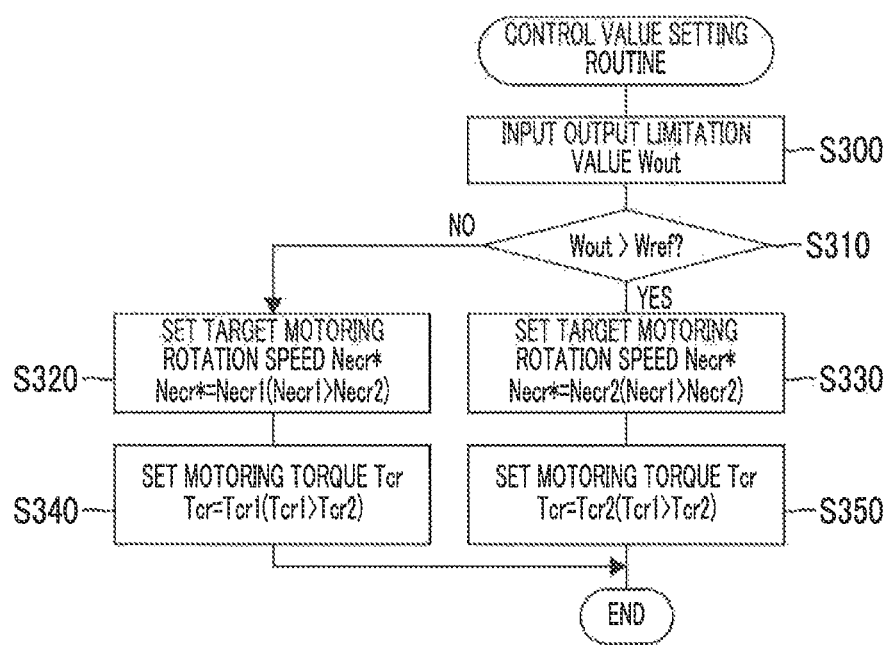
FIG. 9 is a flowchart showing an example of the control value setting routine.

In the hybrid vehicle 20 of the example, the HVECU 70 executes the control value setting routine of FIG. 7. However, the HVECU 70 may execute a control value setting routine of FIG. 9. The control value setting routine of FIG. 9 is the same as the control value setting routine of FIG. 7, except that processing of Steps S340, S350 is added to the control value setting routine of FIG. 7. Accordingly, the same kinds of processing are represented by the same step numbers, and detailed description thereof will not be repeated. Like the control value setting routine of FIG. 7, the control value setting routine of FIG. 9 is executed when the required power Pp* becomes greater than the start threshold Pst (when motoring the engine 22 by the motor MG1 is started).

In the control value setting routine of FIG. 9, in Step S310, when the output limitation value Wout of the battery 50 is equal to or less than the threshold Wref, the HVECU 70 determines that the basic torque (Tp*+Tcn) is able to be output from the motor MG2 to the drive shaft 36 at the time of starting the engine 22. In addition to setting the value Necr1 to the target motoring rotation speed Necr* in Step S320, the HVECU 70 sets a value Tcr1 to the motoring torque Tcr (Step S340), and ends this routine. As the value Tcr1, a comparatively large value, for example, 40 Nm or the like can be used.

In Step S310, when the output limitation value Wout of the battery 50 is greater than the threshold Wref, the HVECU 70 determines that the basic torque (Tp*+Tcn) is unable to be output from the motor MG2 to the drive shaft 36 at the time of starting the engine 22. In addition to setting the value Necr2 smaller than the value Necr1 to the target motoring rotation speed Necr* in Step S330, the HVECU 70 sets a value Tcr2 smaller than the value Tcr1 to the motoring torque Tcr (Step S350), and ends this routine. As the value Tcr2, a comparatively small value, for example, 20 Nm or the like can be used.

As described above, if the basic torque (Tp*+Tcn) is unable to be output from the motor MG2 to the drive shaft 36 at the time of starting the engine 22, torque output to the drive shaft 36 drops compared to before motoring of the engine 22 by the motor MG1 is started. In this modification example, at this time, the motoring torque Tcr is decreased, whereby it is possible to reduce the amount of drop of torque output to the drive shaft 36. As a result, it is possible to prevent the driver from feeling a sense of failure in acceleration (a sense of torque loss). If the motoring torque Tcr is decreased, the time (motoring time) until the rotation speed Ne of the engine 22 reaches the target motoring rotation speed Necr* (=Necr2) is extended. Accordingly, in order to obtain the same effects as in the example, it is necessary to set the value Tcr2 such that the time until the rotation speed Ne of the engine 22 reaches the value Necr2 when the motoring torque Tcr is set to the value Tcr2 becomes shorter than the time until the rotation speed Ne of the engine 22 reaches the value Necr1 when the motoring torque Tcr is set to the value Tcr1.

Figure 10:
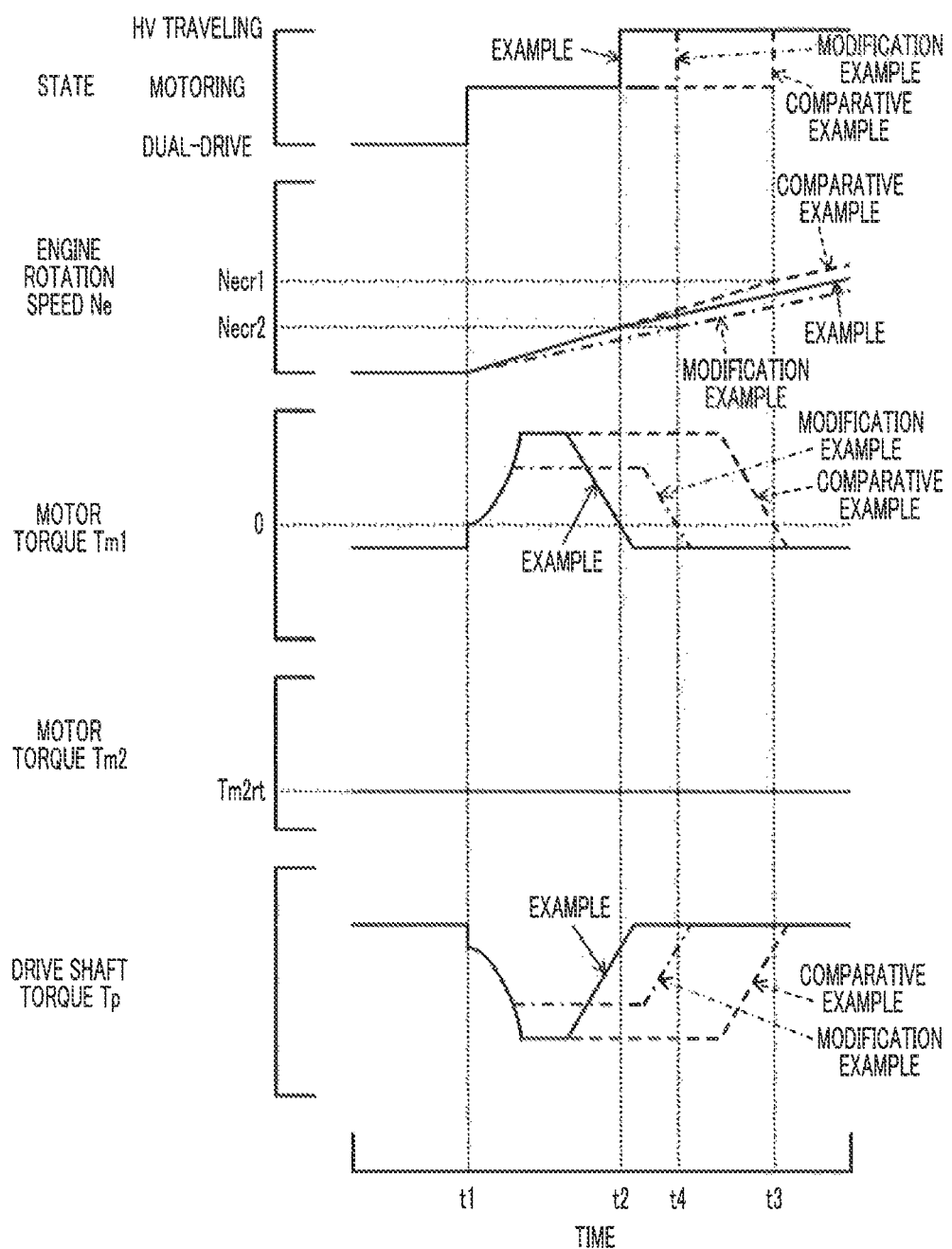
FIG. 10 is an explanatory view showing an example of a state at the time of starting the engine 22 from a state of traveling in dual-drive.

FIG. 10 is an explanatory view showing an example of a state at time of starting the engine 22 from a state of traveling in dual-drive. In the drawing, in regards to others than the torque Tm2 of the motor MG2, a solid line indicates a state (the same as the solid line of FIG. 8) of the example, a broken line a state (the same as the broken line of FIG. 8) of a comparative example, and a one-dot-chain line indicates a state of this modification example. In a case of this modification example, while a time t4 at which the rotation speed Ne of the engine 22 reaches the value Necr2 is delayed (the motoring time is extended) compared to a case of the example, it is possible to reduce the amount of drop of the torque Tp of the drive shaft 36. For the above-described reason, it is necessary to set the value Tcr2 such that the time of t1 to t4 in a case of the modification example becomes shorter than the time of t1 to t3 in a case of the comparative example.

Figure 11:
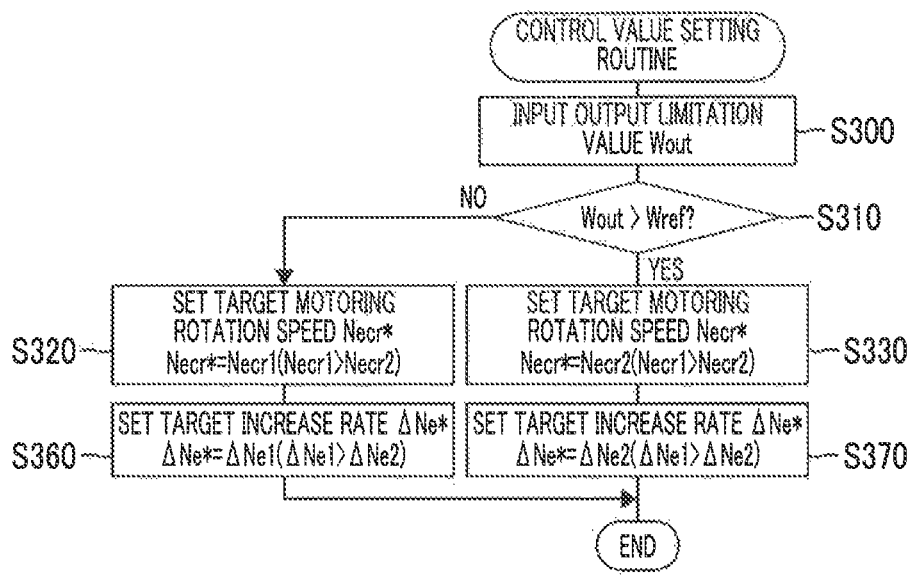
FIG. 11 is a flowchart showing an example of the control value setting routine.

In the hybrid vehicle 20 of the example, the HVECU 70 executes the control value setting routine of FIG. 7. However, the HVECU 70 may execute a control value setting routine of FIG. 11. The control value setting routine of the FIG. 11 is the same as the control value setting routine of FIG. 7, except that processing of Steps S360, S370 is added to the control value setting routine of FIG. 7. Accordingly, the same kinds of processing are represented by the same step numbers, and detailed description thereof will not be repeated. Like the control value setting routine of FIG. 7, the control value setting routine of FIG. 11 is executed when the required power Pp* becomes greater than the start threshold Pst (when motoring of the engine 22 by the motor MG1 is started).

In the control value setting routine of FIG. 11, in Step S310, when the output limitation value Wout of the battery 50 is equal to or less than the threshold Wref, in addition to setting the value Necr1 to the target motoring rotation speed Necr* in Step S320, the HVECU 70 sets a value Rne1 to a target increase rate ΔNe* as a target value of an increase rate ΔNe which is the amount of increase per unit time of the rotation speed Ne of the engine 22 (Step S360), and ends this routine.

The target increase rate ΔNe* of the rotation speed Ne of the engine 22 is the target value of the increase rate ΔNe at the time of increasing the rotation speed Ne of the engine 22 after motoring of the engine 22 by the motor MG1 ends and traveling in the HV traveling mode is started. When the required power Pp* becomes greater than the start threshold Pst and the engine 22 is started, since the required power Pe* is large to a certain extent, when increasing the rotation speed Ne of the engine 22 after traveling in the HV traveling is started is considered. In this modification example, at this time, when performing control such that the increase rate ΔNe of the rotation speed Ne of the engine 22 becomes the target increase rate ΔNe* is considered. As the value ΔNe1, a comparatively large value, for example, 3000 rpm/s or the like can be used.

In Step S310, when the output limitation value Wout of the battery 50 is greater than the threshold Wref, in addition to setting the value Necr2 smaller than the value Necr1 to the target motoring rotation speed Necr* in Step S330, a value ΔNe2 smaller than the value ΔNe1 is set to the target increase rate ΔNe* of the rotation speed Ne of the engine 22 (Step S370), and this routine ends. As the value ΔNe2, a comparatively small value, for example 1500 rpm/s or the like can be used.

Figure 12:
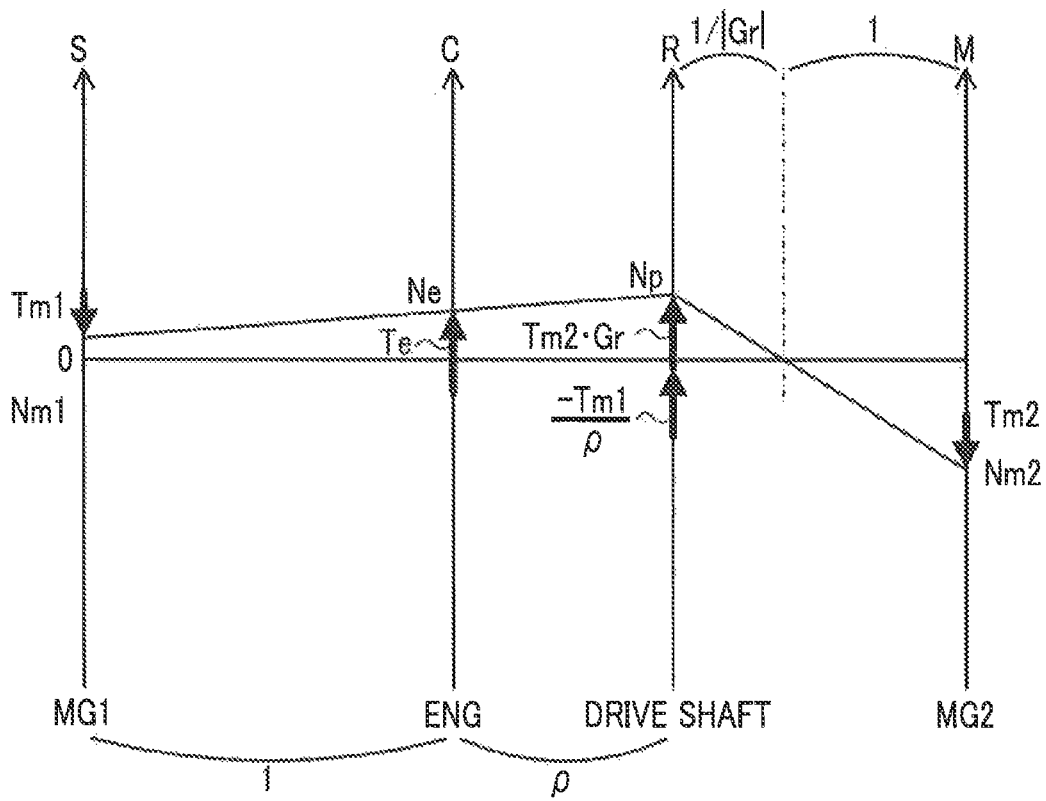
FIG. 12 is an explanatory view showing an example of a collinear diagram of the planetary gear 30 during traveling in HV traveling.

FIG. 12 is an explanatory view showing an example of a collinear diagram of the planetary gear 30 during traveling in the HV traveling. As will be understood from FIG. 12, when traveling in the HV traveling is performed, traveling is performed with the above-described directly transmitted torque (torque applied to the drive shaft 36 through the planetary gear 30 with positive torque from the engine 22 and negative torque from the motor MG1) and torque which is output from the motor MG2 and applied to the drive shaft 36. When the output limitation value Wout of the battery 50 is greater than the threshold Wref, since the value Necr2 is set to the target motoring rotation speed Necr*, the rotation speed Ne of the engine 22 when motoring of the engine 22 by the motor MG1 ends is small compared to when the value Necr1 is set to the target motoring rotation speed Necr*. For this reason, it is considered that power of the engine 22 at the time of starting traveling in the HV traveling is not large as much. At this time, if the comparatively large value ΔNe1 is set to the target increase rate ΔNe* of the rotation speed Ne of the engine 22, since it is necessary to make the absolute value of the negative torque from the motor MG1 comparatively small in order to make the increase rate ΔNe of the rotation speed Ne of the engine 22 comparatively large, the directly transmitted torque is hardly increased. In contrast, in this modification example, when the output limitation value Wout of the battery 50 is greater than the threshold Wref, in addition to setting the value Necr2 to the target motoring rotation speed Necr*, the value ΔNe2 smaller than the value ΔNe1 is set to the target increase rate ΔNe* of the rotation speed Ne of the engine 22. With this, since it is possible to make the absolute value of the negative torque from the motor MG1 comparatively large, it is possible to increase the directly transmitted torque, and to increase torque output to the drive shaft 36. As a result, it is possible to prevent the driver from feeling a sense of slowness.

Figure 13:
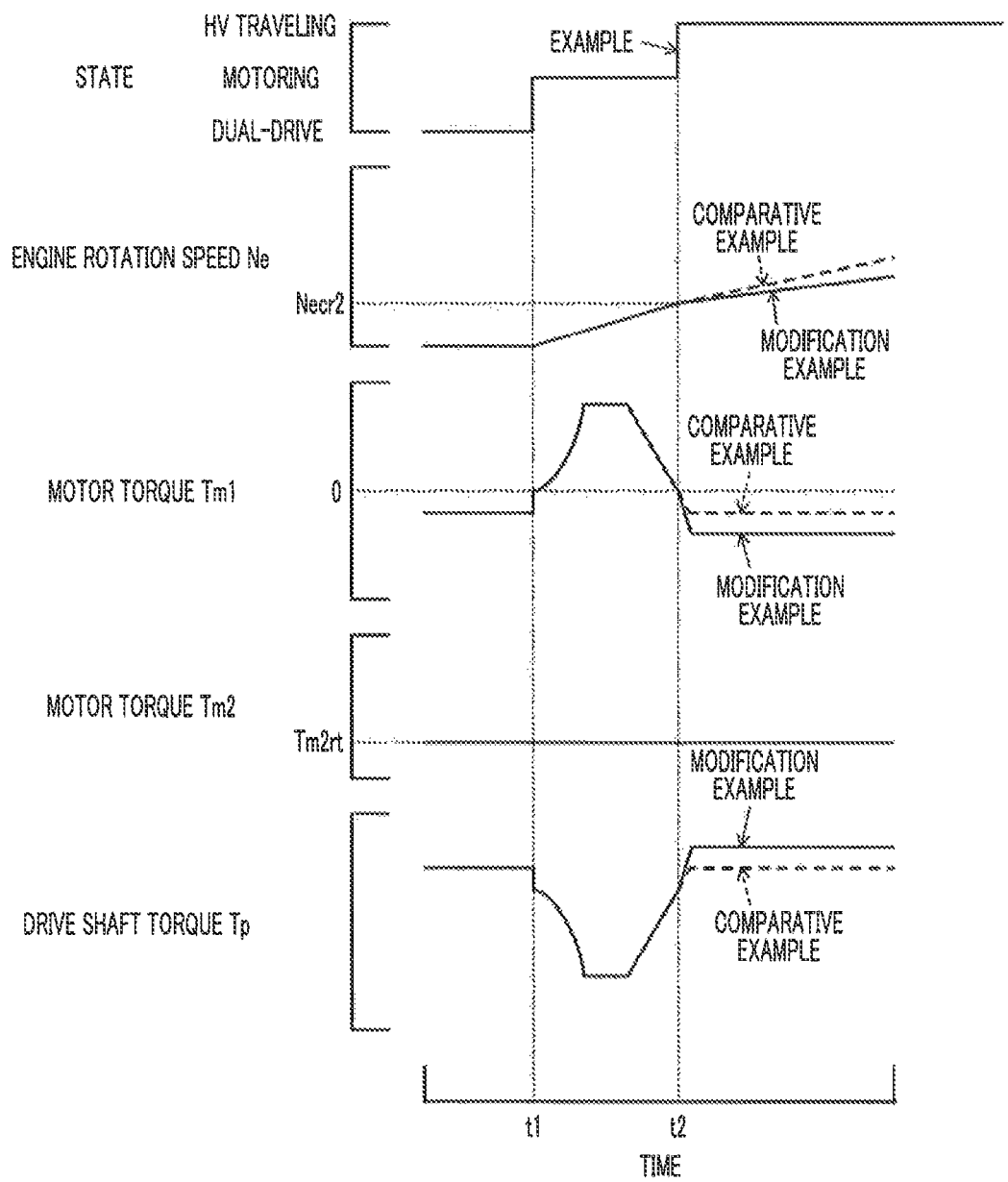
FIG. 13 is an explanatory view showing an example of a state at the time of starting the engine 22 from a state of traveling in dual-drive.

FIG. 13 is an explanatory view showing an example of a state at the time of starting the engine 22 from a state of traveling in dual-drive. In the drawing, in regards to the rotation speed Ne of the engine 22, the torque Tm1 of the motor MG1, and the torque Tp of the drive shaft 36, a solid line indicates a state of this modification example, and a broken line indicates a state of a comparative example. As the comparative example in FIG. 13, when the value Necr2 is set to the target motoring rotation speed Necr* as in the example, and the comparatively large value ΔNe1 is set to the target increase rate ΔNe* of the rotation speed Ne of the engine 22 is considered. In this modification example and the comparative example, a state until a time t2 at which motoring of the engine 22 by the motor MG1 ends is the same as the state of the example of FIG. 8. In a case of this modification example, compared to the comparative example, since the negative torque from the motor MG1 can be increased by decreasing the increase rate ΔNe of the rotation speed Ne of the engine 22 after the time t2, it is possible to increase torque output to the drive shaft 36. As a result, it is possible to prevent a driver from feeling a sense of slowness.

In this modification example, when the required power Pp* becomes greater than the start threshold Pst (when motoring of the engine 22 by the motor MG1 is started), the control value setting routine of FIG. 11 is executed to set the target motoring rotation speed Necr* and the target increase rate ΔNe*. However, the target motoring rotation speed Necr* may be set when the required power Pp* becomes greater than the start threshold Pst, and the target increase rate ΔNe* may be set when the rotation speed Ne of the engine 22 reaches the target motoring rotation speed Necr* (when motoring of the engine 22 by the motor MG1 ends) or during the execution of motoring of the engine 22 by the motor MG1.

In this modification example, the HVECU 70 executes the control value setting routine of FIG. 11 in which the processing of Steps S360, S370 is added to the control value setting routine of FIG. 7. However, the HVECU 70 may execute a routine in which the processing of Steps S360, S370 is added to the control value setting routine of FIG. 9.

In the hybrid vehicle 20 of the example, the HVECU 70 executes the control value setting routine of FIG. 7. However, the HVECU 70 may execute a control value setting routine of FIG. 14. The control value setting routine of FIG. 14 is the same as the control value setting routine of FIG. 7, except that processing of Steps S400, S410 is added to the control value setting routine of FIG. 7. Accordingly, the same kinds of processing are represented by the same step numbers, and detailed description thereof will not be repeated. Like the control value setting routine of FIG. 7, the control value setting routine of FIG. 14 is executed when the required power Pp* becomes greater than the start threshold Pst (when motoring of the engine 22 by the motor MG1 is started).

In the control value setting routine of FIG. 14, if the output limitation value Wout of the battery 50 is input (Step S300), the HVECU 70 determines whether the CD mode is executed or the CS mode is executed (Step S400), when it is determined that the CS mode is determined, determines that the basic torque (Tp*+Tcn) is able to be output from the motor MG2 to the drive shaft 36 at the time of starting the engine 22, sets the value Necr1 to the target motoring rotation speed Necr* in Step S320, and ends this routine.

In Step S400, when the CD mode is executed, it is determined whether the engine 22 is started from single-drive or the engine 22 is started from dual-drive (Step S410). Then, when the engine 22 is started from dual-drive, it is determined that the basic torque (Tp*+Tcn) is unable to be output from the motor MG2 to the drive shaft 36 at the time of starting the engine 22, the value Necr2 smaller than the value Necr1 is set to the target motoring rotation speed Necr* in Step S330, and this routine ends.

In Step S410, when the engine 22 is started from single-drive, the output limitation value Wout of the battery 50 is compared with the threshold Wref (Step S410). Then, when the output limitation value Wout of the battery 50 is equal to or less than the threshold Wref, it is determined that the basic torque (Tp*+Tcn) is able to be output from the motor MG2 to the drive shaft 36 at the time of starting the engine 22, the value Necr1 is set to the target motoring rotation speed Necr* in Step S320 (Step S320), and this routine ends. In contrast, when the output limitation value Wout of the battery 50 is greater than the threshold Wref, it is determined that the basic torque (Tp*+Tcn) is unable to be output from the motor MG2 to the drive shaft 36 at the time of starting the engine 22, the value Necr2 smaller than the value Necr1 is set to the target motoring rotation speed Necr* (Step S330), and this routine ends.

When the CS mode is executed, the output limitation value Wout of the battery 50 is equal to or less than the threshold Wref, and at the time of starting the engine 22 from dual-drive in the CD mode, the output limitation value Wout of the battery 50 is greater than the threshold Wref. Accordingly, the method of setting the target motoring rotation speed Necr* (the value Necr1 or the value Necr2) by the execution of the control value setting routine of FIG. 14 is substantially the same as the method of setting the target motoring rotation speed Necr* by the execution of the control value setting routine of FIG. 7.

In the hybrid vehicle 20 of the example, the one-way clutch C1 is attached to the crank shaft 26 of the engine 22 (the carrier 34 of the planetary gear 30). However, as shown in a hybrid vehicle 120 of an example of FIG. 15, the crank shaft 26 of the engine 22 may be unrotatably fixed (connected) to the case 21 and a brake B1 which rotatably releases the crank shaft 26 of the engine 22 with respect to the case 21 may be provided. In this case, in the EV traveling mode, the brake B1 may be brought into an engagement state to bring the engine 22 in a rotation stop state. In the HV traveling mode, the brake B1 may be brought into a release state to bring the engine 22 in a rotation state.

In the hybrid vehicle 20 of the example, the motor MG2 is connected to the drive shaft 36 through the reduction gear 35. However, the motor MG2 may be directly coupled to the drive shaft 36. Furthermore, the motor MG2 may be connected to the drive shaft 36 through a transmission.

In the hybrid vehicle 20 of the example, the planetary gear device has one planetary gear 30. However, the planetary gear device may have a plurality of planetary gears. In this case, a configuration shown in a hybrid vehicle 220 of a modification example of FIG. 16 may be made.

Figure 16:
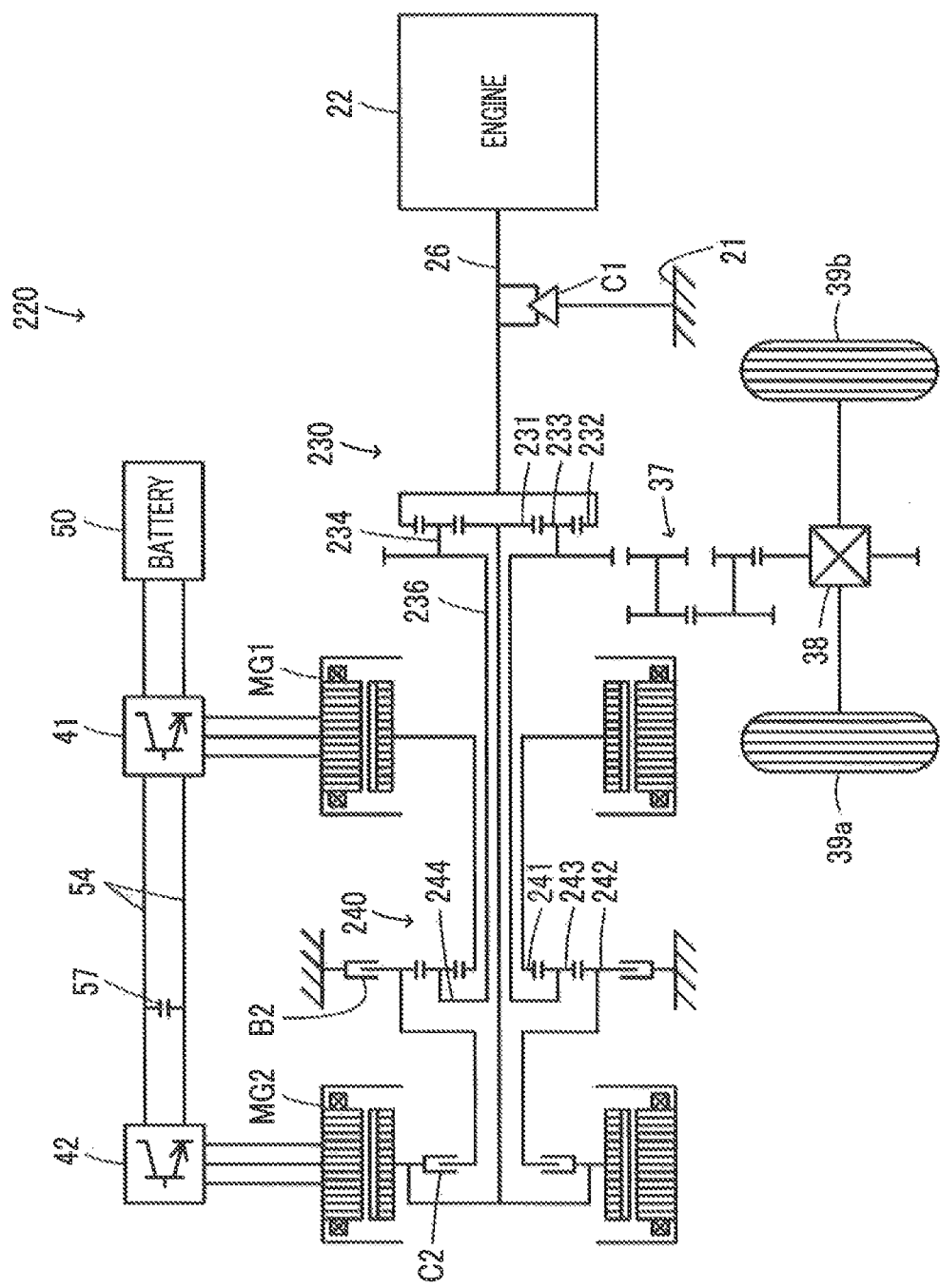
FIG. 16 is a configuration diagram showing the outline of the configuration of a hybrid vehicle 220 of a modification example.

The hybrid vehicle 220 of the modification example of FIG. 16 has, as a planetary gear device, planetary gears 230, 240 instead of the planetary gear 30 of the hybrid vehicle 20, and additionally has a clutch C2 and a brake B2.

The planetary gear 230 is constituted as a single pinion type planetary gear (planetary gear), and has a sun gear 231 as an external gear, a ring gear 232 as an internal gear, a plurality of pinion gears 233 which mesh with the sun gear 231 and the ring gear 232, and a carrier 234 which holds a plurality of pinion gears 233 rotatably and revolvably. The rotor of the motor MG2 is connected to the sun gear 231. The crank shaft 26 of the engine 22 is connected to the ring gear 232. A drive shaft 236 coupled to the drive wheels 39a, 39b through the differential gear 38 and the gear mechanism 37 is connected to the carrier 234.

The planetary gear 240 is constituted as a single pinion type planetary gear (planetary gear), and has a sun gear 241 as an external gear, a ring gear 242 as an internal gear, a plurality of pinion gears 243 which mesh with the sun gear 241 and the ring gear 242, and a carrier 244 which holds a plurality of pinion gears 243 rotatably and revolvably. The rotor of the motor MG1 is connected to the sun gear 241. The drive shaft 236 is connected to the carrier 244.

The clutch C2 connects the sun gear 231 of the planetary gear 230 and the motor MG2 to the ring gear 242 of the planetary gear 240 and releases the connection of the sun gear 231 of the planetary gear 230 and the motor MG2 to the ring gear 242 of the planetary gear 240. The brake B2 fixes (connects) the ring gear 242 of the planetary gear 240 to the case 21 unrotatably and releases the ring gear 242 rotatably with respect to the case 21.

Figure 17:
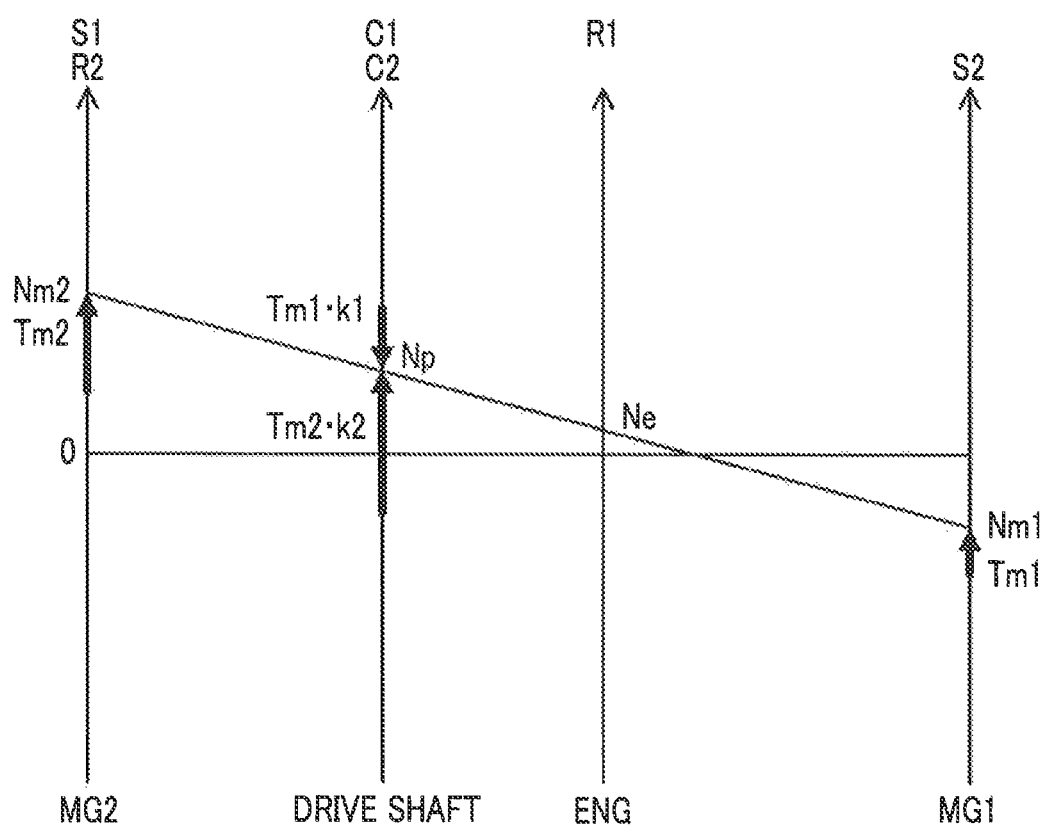
FIG. 17 is an explanatory view showing an example of a collinear diagram of planetary gears 230, 240 at the time of starting the engine 22 when a clutch C2 is brought into an engagement state and a brake B2 is brought into a release state.

FIG. 17 is an explanatory view showing an example of a collinear diagram of the planetary gears 230, 240 at the time of starting the engine 22 when the clutch C2 is brought into an engagement state and the brake B2 is brought into a release state.

In FIG. 17, an S1 and R2 axis indicates the rotation speed Nm2 of the motor MG2 which is the rotation speed of the sun gear 231 of the planetary gear 230, and indicates the rotation speed of the ring gear 242 of the planetary gear 240, a C1 and C2 axis indicates a rotation speed Np of the drive shaft 236 which is the rotation speeds of the carriers 234, 244 of the planetary gears 230, 240, an R1 axis indicates the rotation speed Ne of the engine 22 which is the rotation speed of the ring gear 232 of the planetary gear 230, and an S2 axis indicates the rotation speed Nm1 of the motor MG1 which is the rotation speed of the sun gear 241 of the planetary gear 240.

In FIG. 17, a bold arrow on the S2 axis indicates torque Tm1 which is output from the motor MG1, a bold arrow on the S1 and R2 axis shows torque Tm2 which is output from the motor MG2, and two bold arrows on the C1 and C2 axis indicate torque (Tm1·k1+Tm2·k2) which are output from the motors MG1, MG2 and applied to the drive shaft 236. The conversion coefficient k1 is a coefficient for converting the torque Tm1 of the motor MG1 into the torque of the drive shaft 236. The conversion coefficient k2 is a coefficient for converting the torque Tm2 of the motor MG2 into the torque of the drive shaft 236.

In a case of FIG. 17, the clutch C2 is brought into the engagement state, whereby the rotation speed of the sun gear 231 of the planetary gear 230 and the rotation speed Nm2 of the motor MG2 become equal to the rotation speed of the ring gear 242 of the planetary gear 240. Accordingly, the planetary gears 230, 240 function as a so-called four-element type planetary gear device.

As will be understood from FIG. 17, at the time of starting the engine 22, the positive torque Tm1 (=Tcr) is output from the motor MG1 to crank the engine 22. Then, torque obtained by limiting the above-described basic torque (Tp*+ Tcn) such that the charge/discharge power of the battery 50 is within the range of the output limitation value Wout and the torque Tm2 from the motor MG2 is within the range of the rated torque Tm2rt on the negative side (the downward side of FIG. 17) may be output from the motor MG2 to the drive shaft 36. Accordingly, the control value setting routine of FIG. 7, or the like is executed, whereby it is possible to prevent the drive from feeling a sense of failure in acceleration (a sense of torque loss) like the example.

The correspondence relationship between the primary components of the example and the primary components of the disclosure described in SUMMARY OF THE DISCLOSURE will be described. In the example, the engine 22 is an example of an "engine", the motor MG1 is an example of a "first motor", the planetary gear 30 is an example of a "planetary gear", the motor MG2 is an example of a "second motor", the one-way clutch C1 is an example of a "rotation regulating mechanism", the battery 50 is an example of a "battery", and the HVECU 70, the engine ECU 24, the motor ECU 40, and the battery ECU 52 are an example of an "electronic control unit". The HVECU 70, the engine ECU 24, the motor ECU 40, and the battery ECU 52 may be included in one electronic control unit.

A "planetary gear device" may have a planetary gear having a sun gear to which the first motor is connected, a carrier to which the engine is connected, and a ring gear to which a drive shaft is connected, and the "second motor" may be directly coupled to the drive shaft. The "planetary gear device" may have a planetary gear having a sun gear to which the first motor is connected, a carrier to which the engine is connected, and a ring gear to which the drive shaft is connected, and a reduction gear connected to the ring gear, and the "second motor" may be connected to the ring gear through the reduction gear to be mechanically coupled to the drive shaft. The "planetary gear device" may have a first planetary gear having a first sun gear, a first carrier to which the drive shaft is connected, and a first ring gear to which the engine is connected, a second planetary gear having a second sun gear to which the first motor is connected, a second carrier to which the drive shaft and the first carrier are connected, and a second ring gear, a clutch which connects the first sun gear and the second ring gear and releases the connection of the first sun gear and the second ring gear, and a brake which fixes the second ring gear unrotatably and releases the second ring gear rotatably, and the "second motor" may be connected to the first sun gear to be mechanically coupled to the drive shaft.

A "target motoring rotation speed" is set as a rotation speed higher than a rotation speed at which the operation control (fuel injection control, ignition control, and the like) of the engine is started.

The correspondence relationship between the primary components of the example and the primary components of the disclosure described in SUMMARY should not be considered to limit the components of the disclosure described in SUMMARY since the example is only illustrative to specifically describe the aspects of the disclosure. That is, the disclosure described in SUMMARY should be interpreted based on the description in SUMMARY, and the example is only a specific example of the disclosure described in SUMMARY.

Although the mode for carrying out the disclosure has been described above in connection with the example, the disclosure is not limited to the example, and can be of course carried out in various forms without departing from the spirit and scope of the disclosure.

The disclosure is usable in a manufacturing industry of a vehicle, or the like.

What is claimed is:

1. A hybrid vehicle comprising:
an engine;
a first motor;
a drive shaft coupled to the first motor and an axle;
a planetary gear device including at least one planetary gear, the at least one planetary gear including rotating elements, the rotating elements being connected to the engine and the drive shaft such that the first motor, the engine, and the drive shaft are arranged in this order in a collinear diagram;
a second motor mechanically coupled to the drive shaft;
a battery configured to exchange electric power with the first motor and the second motor; and
an electronic control unit configured to perform control such that motoring torque for motoring the engine is output from the first motor during starting the engine,
the electronic control unit being configured to perform control such that post-limitation torque is output from the second motor to the drive shaft, the post-limitation torque being torque obtained by limiting basic torque such that charge and discharge power of the battery is within a range of maximum allowable power of the battery and torque from the second motor is within a range of rated torque of the second motor, the basic torque being the sum of required torque and cancel torque, the required torque being torque required for the drive shaft, the cancel torque being torque for cancelling torque applied to the drive shaft with the output of the motoring torque from the first motor, and
the electronic control unit being configured to perform one of first control and second control when the basic torque is unable to be output from the second motor to the drive shaft, the first control being control for making a target motoring rotation speed lower than when the basic torque is output from the second motor to the drive shaft, the target motoring rotation speed being a rotation speed of the engine for ending the output of the motoring torque from the first motor, and the second control being control for making a motoring time shorter than when the basic torque is output from the second motor to the drive shaft, the motoring time being a time for outputting the motoring torque from the first motor.

2. The hybrid vehicle according to claim 1,
wherein the electronic control unit is configured to perform a third control when the basic torque is unable to be output from the second motor to the drive shaft, the third control is control for making the motoring torque lower than when the basic torque is output from the second motor to the drive shaft.

3. The hybrid vehicle according to claim 1, further comprising:
a rotation regulating mechanism configured to regulate the rotation of the engine,
wherein the electronic control unit is configured to perform dual-drive control while outputting the rated torque from the second motor when the maximum allowable power of the battery is greater than rated power of the second motor and required power according to the required torque is greater than the rated power of the second motor in an electric traveling state, the electric traveling state is a state that the hybrid vehicle travels with bringing the engine into a rotation stop state by the rotation regulating mechanism, the dual-drive control is control for controlling the first motor and the second motor such that the hybrid vehicle travels with torque from the first motor and the second motor, and
the electronic control unit is configured to determine that the basic torque is unable to be output from the second motor to the drive shaft when the engine is started during the execution of the dual-drive control.

4. The hybrid vehicle according to claim 1,
wherein the electronic control unit is configured to start the engine when the required power according to the required torque is greater than a start threshold, the start threshold is set to be greater when the maximum allowable power of the battery is large than when the maximum allowable power of the battery is small,
the electronic control unit is configured to determine that the basic torque is able to be output from the second motor to the drive shaft during starting the engine when the maximum allowable power of the battery is equal to or less than predetermined power smaller than rated power of the second motor, and
the electronic control unit is configured to determine that the basic torque is unable to be output from the second motor to the drive shaft during starting the engine when the maximum allowable power of the battery is greater than the predetermined power.

5. The hybrid vehicle according to claim 4,
wherein the electronic control unit is configured to perform control such that the hybrid vehicle travels in one of a charge sustaining mode and a charge depleting mode,
the electronic control unit is configured to set the maximum allowable power such that a value of the maximum allowable power becomes a value of basic allowable power when the charge depleting mode is executed, the basic allowable power is power based on a temperature and a power storage ratio of the battery, and
the electronic control unit is configured to set the maximum allowable power such that the value of the maximum allowable power becomes a value obtained by limiting the basic allowable power with second predetermined power when the charge sustaining mode is executed, the second predetermined power being power equal to or less than the predetermined power.

6. The hybrid vehicle according to claim 1,
wherein the electronic control unit is configured to decrease an increase rate of the rotation speed of the engine during increasing the rotation speed of the engine after motoring of the engine by the first motor ends when the target motoring rotation speed is low compared to when the target motoring rotation speed is high, the increase rate of the rotation speed of the engine being an increase rate per unit time of the rotation speed of the engine.

7. The hybrid vehicle according to claim 1,
wherein the electronic control unit is configured to decrease an increase rate of the rotation speed of the engine during increasing the rotation speed of the engine after motoring of the engine by the first motor ends when the motoring time is short compared to when the motoring time is long, the increase rate of the rotation speed of the engine being an increase rate per unit time of the rotation speed of the engine.

8. A control method for a hybrid vehicle, the hybrid vehicle including an engine, a first motor, a drive shaft, a planetary gear device, a second motor, a battery, and an electronic control unit, the drive shaft being coupled to the first motor and an axle, the planetary gear device including at least one planetary gear, the planetary gear device including rotating elements, the rotating elements being connected to the engine and the drive shaft such that the first motor, the engine, and the drive shaft are arranged in this order in a collinear diagram, the second motor being mechanically coupled to the drive shaft, and the battery being configured to exchange electric power with the first motor and the second motor, the control method comprising:

allowing, by the electronic control unit, motoring torque for motoring the engine to be output from the first motor during starting the engine;

allowing, by the electronic control unit, post-limitation torque to be output from the second motor to the drive shaft; and performing, by the electronic control unit, one of first control and second control when basic torque is unable to be output from the second motor to the drive shaft, the post-limitation torque being torque obtained by limiting the basic torque such that charge and discharge power of the battery is within a range of maximum allowable power of the battery and torque from the second motor is within a range of rated torque of the second motor, the basic torque being the sum of required torque and cancel torque, the required torque being torque required for the drive shaft, the cancel torque being torque for cancelling torque applied to the drive shaft with the output of the motoring torque from the first motor, the first control being control for making a target motoring rotation speed lower than when the basic torque is output from the second motor to the drive shaft, the target motoring rotation speed being a rotation speed of the engine for ending the output of the motoring torque from the first motor, and the second control is control for making a motoring time shorter than when the basic torque is output from the second motor to the drive shaft, the motoring time being a time for outputting the motoring torque from the first motor.

* * * * *